US009579814B2

(12) United States Patent
Pantonial et al.

(10) Patent No.: US 9,579,814 B2
(45) Date of Patent: Feb. 28, 2017

(54) MOTOR CONTROL SYSTEM AND METHOD FOR A ROTARY HOLE PUNCH SYSTEM

(71) Applicant: Lexmark International, Inc., Lexington, KY (US)

(72) Inventors: Roel Firmeza Pantonial, Cebu (PH); Brian Anthony Reichert, Lexington, KY (US); Andrew Keith Walker, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 277 days.

(21) Appl. No.: 14/258,067

(22) Filed: Apr. 22, 2014

(65) Prior Publication Data

US 2015/0298336 A1 Oct. 22, 2015

(51) Int. Cl.

*B26D 1/00* (2006.01)
*B23Q 15/00* (2006.01)
*B26D 5/20* (2006.01)
*B26D 5/08* (2006.01)
*B26D 5/00* (2006.01)
*B26F 1/02* (2006.01)

(52) U.S. Cl.

CPC ............... *B26D 5/20* (2013.01); *B26D 5/005* (2013.01); *B26D 5/086* (2013.01); *B26F 1/02* (2013.01)

(58) Field of Classification Search

CPC .......... B26D 5/20; B26D 5/086; B26D 5/005; B26F 1/02
USPC .................................... 83/33, 34, 74, 522.15
See application file for complete search history.

(56) References Cited

U.S. PATENT DOCUMENTS 5,697,272 A * 12/1997 Tsuzaki .................... B26D 5/20 234/1
5,879,278 A * 3/1999 Cox ......................... B26D 5/20 29/412
6,360,640 B1 * 3/2002 Cote ......................... B26D 5/20 83/286
9,061,433 B2 * 6/2015 Nakamura ............... B26D 5/02
9,104,192 B2 * 8/2015 Brand ..................... G05B 19/31
2009/0110516 A1 * 4/2009 Hasegawa ................ B26D 5/02 412/13
2010/0072693 A1 * 3/2010 Ishikawa ................ B26D 7/015 271/227

* cited by examiner

*Primary Examiner* — Omar Flores Sanchez
(74) *Attorney, Agent, or Firm* — John Victor Pezdek

(57) ABSTRACT

A sheet processing apparatus and methods of utilizing the same. The sheet processing apparatus includes a punch mechanism disposed along a media path at a punch point at which a hole is to be punched through a punch location on a media sheet advancing along the media path. The punch mechanism includes a rotatable punch arm having a punch head, and a punch motor for rotating the punch arm. As the punch location on the advancing media sheet approaches the punch point, speed of the punch motor is controlled to adjust a rotational speed of the punch arm based on feedback signals associated with each of the punch motor and a media path motor used to advance the media sheet such that the punch head arrives at the punch point at substantially the same time as when the punch location on the media sheet arrives at the punch point.

22 Claims, 13 Drawing Sheets

MOTOR CONTROL SYSTEM AND METHOD FOR A ROTARY HOLE PUNCH SYSTEM

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

Field of the Disclosure

The present disclosure relates generally to media sheet finishing apparatuses, and, more particularly, to a hole punch system for punching holes through a media sheet, and methods of utilizing the same.

Description of the Related Art

Sheet processing devices are used to perform further processing, such as stapling and punching, on media sheets that have undergone image formation. In recent years, imaging devices have been incorporated with finishers, which include hole punch and/or stapler mechanisms, post stage after image formation in order to apply finishing to imaged media sheets.

One known type of sheet punch mechanism creates holes in a sheet using a rotary punch. With this type of mechanism, holes are punched in the media sheet by advancing the media sheet along a media path while at the same time rotating a punch and a die in the same direction as the media sheet feed direction. Holes are punched through the sheet when both punch and die meet at a common point (the punch point) along the media path while the advanced media sheet is between the punch and die. Accordingly, holes can be punched through the media sheet without stopping the media sheet, allowing higher throughput.

In some existing rotary punch type mechanisms, stepper motors are used as punch motors to rotate both the punch and die because of the simple control configuration of stepper motors. More particularly, due to a stepper motor's nature of rotation by fractional increments or steps, it can be easily driven using open-loop control to provide positioning of the punch and die without requiring any feedback signal. That is, by knowing the speed of the media sheet and the expected time that a desired punch location on the media sheet will reach the punch point within the punch system, one can easily command the stepper motor to run a number of steps at a particular rotational speed that would cause the punch and die to also engage the punch point at the expected time of arrival of the punch location at the punch point.

Unfortunately, open-loop stepper motor control has several drawbacks such as when used in hole punch systems. In terms of cost, systems utilizing stepper motors are generally expensive. In terms of reliability, hole punch systems utilizing open-loop stepper motor control cannot compensate for any disturbance of or correct any error in the system. For example, punch systems have varying loads (e.g., different media types, speeds, etc.) and position and/or speed control of the stepper motor can be lost if a specific media type slows the rotational speed of the rotary punch from what is being commanded. Since open-loop motor control does not use sensors to determine actual speed or rotational position, the system cannot determine errors in punch speed and position and, thus, cannot perform compensations if any form of disturbance occurs. This often results in drift and incorrect hole positions which compromises hole quality. In order to ensure that the stepper motor would not stall over the range of the expected load, a torque margin is necessary which in turn results to more power consumption by the system. In another example, stepper motors operate at relatively low speeds and, typically, need to be parked at a home position occasionally (or after every punch) to set up the punch properly for the next hole. This prevents hole punching at high process speeds and affects flexibility in hole placement along the edge of the media for varying media sheet sizes. Moreover, if there are changes in the operating parameters of the imaging system, stepper motors may need to be re-qualified to ensure reliable operation with the new operating parameters.

It would be desirable to have a cost effective and reliable hole punch system that avoids the aforementioned drawbacks.

SUMMARY

Disclosed is a sheet processing apparatus for punching one or more holes through a media sheet. The sheet processing apparatus comprises a plurality of feed rolls disposed along a media path through the sheet processing apparatus, a media path motor operatively coupled to the plurality of feed rolls for rotating the plurality of feed rolls to advance the media sheet along the media path, a first sensing mechanism associated with the media path motor for sensing motion thereof, and a punch mechanism disposed along the media path at a punch point at which a hole is to be punched through the media sheet advancing along the media path at a predetermined punch location on the advancing media sheet. The punch arm includes a rotatable punch arm having a punch head at a free end thereof, a punch motor operatively coupled to the punch arm for rotating the punch arm, and a second sensing mechanism associated with the punch motor for sensing motion thereof. The punch arm is rotatable to the punch point at which the punch head is engageable with the advancing media sheet to punch a hole therethrough at the punch location while passing through the punch point. In an example embodiment, each of the media path motor and the punch motor comprises one of a brushless DC motor and a brushed DC motor.

A controller is coupled to the media path motor, the punch motor, and the first and second sensing mechanisms. As the punch location on the advancing media sheet approaches the punch point, the controller receives feedback signals associated with each of the media path motor and the punch motor from the first and second sensing mechanisms, respectively, and controls a speed of the punch motor to adjust a rotational speed of the punch arm based on the feedback signals from both the first and second sensing mechanisms so that the punch head arrives at the punch point at substantially the same time as when the punch location on the advancing media sheet arrives at the punch point.

Further disclosed is a method of controlling the punch motor for punching a hole through the media sheet. The method comprises advancing the media sheet along the media path to punch a hole therethrough at the punch location, and applying a drive signal to the punch motor to initiate rotation of the punch arm toward the punch point at a rotational speed. During the advancing of the media sheet and the rotation of the punch arm, motion feedback signals associated with each of the media path motor and the punch motor are obtained. Based on the obtained motion feedback signals, the drive signal for the punch motor is varied to drive the punch arm at a rotational speed to cause the punch head to arrive at the punch point at substantially the same time as the punch location on the media sheet arrives at the punch point.

During a first portion of a rotational punching cycle of the punch arm before the punch arm arrives at the punch point, positions of each of the punch location and the punch head relative to the punch point are determined, and a position error based on a difference between the determined positions is calculated. The speed of the punch motor is then varied to substantially reduce the position error toward zero. During a second portion of the rotational punching cycle following the first portion thereof and within which the punch arm arrives at the punch point, a linear speed of the media sheet is determined, and the speed of the punch motor is adjusted such that a linear speed of the punch head substantially follows the linear speed of the media sheet.

BRIEF DESCRIPTION OF THE DRAWINGS

The above-mentioned and other features and advantages of the disclosed embodiments, and the manner of attaining them, will become more apparent and will be better understood by reference to the following description of the disclosed embodiments in conjunction with the accompanying drawings.

DETAILED DESCRIPTION

Figure 1:
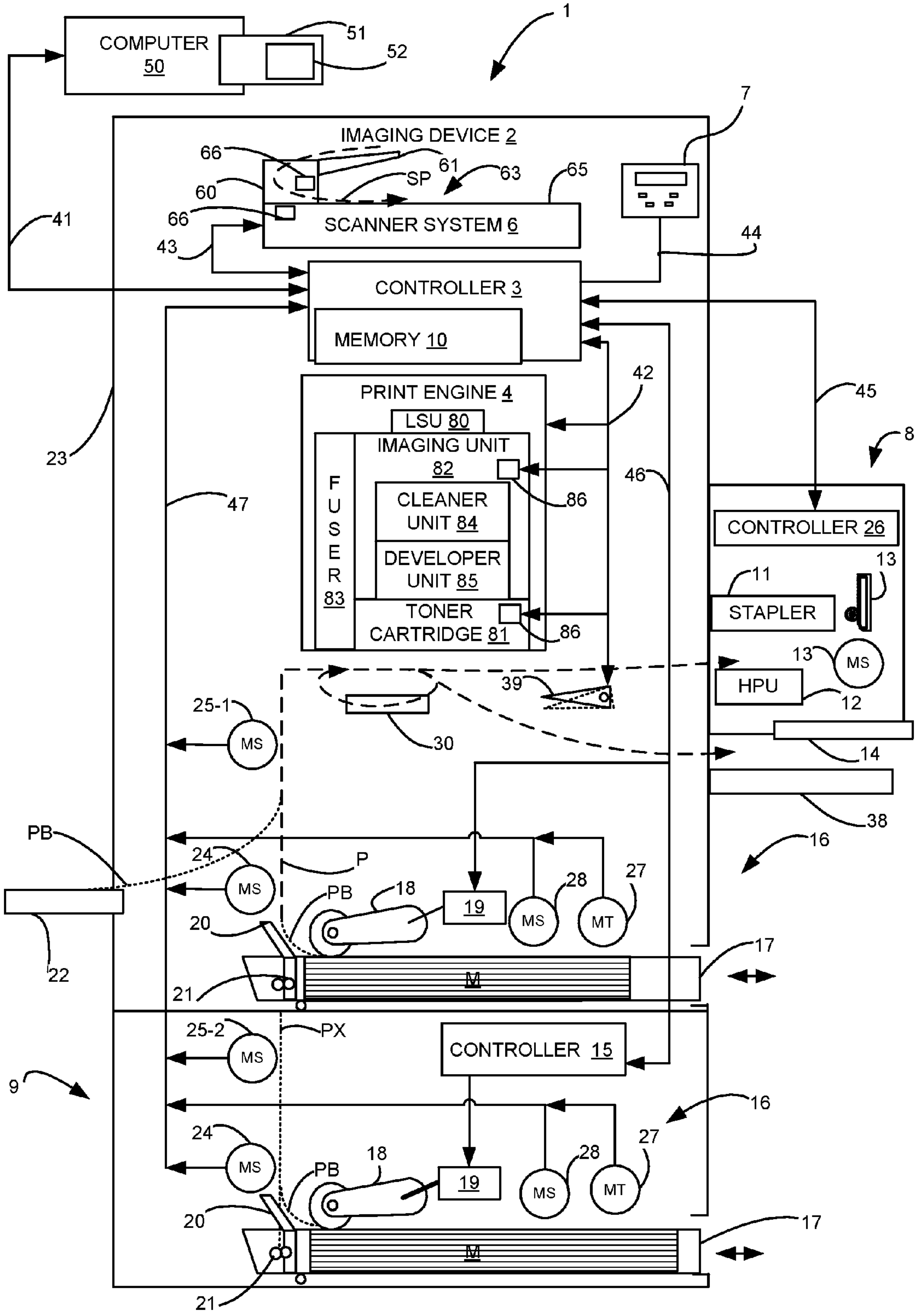
FIG. 1 is a schematic illustration of an imaging system including an imaging device.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having", "containing", "including", "comprising", and the like are open-ended terms that indicate the presence of stated elements or features, but do not preclude additional elements or features. The articles "a", "an", and "the" are intended to include the plural as well as the singular, unless the context clearly indicates otherwise. The use of "including," "comprising," or "having" and variations thereof herein is meant to encompass the items listed thereafter and equivalents thereof as well as additional items.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top", "bottom", "front", "back", "rear", "side", "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, operations, etc. and are also not intended to be limiting or be a required order of performance unless otherwise stated. Like terms refer to like elements throughout the description.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the present disclosure and that other alternative mechanical configurations are possible.

It will be further understood that each block of the diagrams, and combinations of blocks in the diagrams, respectively, may be implemented by computer program instructions. These computer program instructions may be loaded onto a general purpose computer, special purpose computer, processor, or other programmable data processing apparatus to produce a machine, such that the instructions which execute on the computer or other programmable data processing apparatus may create means for implementing the functionality of each block or combinations of blocks in the diagrams discussed in detail in the descriptions below. These computer program instructions may also be stored in a non-transitory, tangible, computer readable storage medium that may direct a computer or other programmable data processing apparatus to function in a particular manner, such that the instructions stored in the computer readable storage medium may produce an article of manufacture including an instruction means that implements the function specified in the block or blocks. Computer readable storage medium includes, for example, disks, CD-ROMS, Flash ROMS, nonvolatile ROM and RAM. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks. Output of the computer program instructions may be displayed in a user interface or computer display of the computer or other programmable apparatus that implements the functions or the computer program instructions.

The term "output" as used herein encompasses output from any printing device such as color and black-and-white copiers, color and black-and-white printers, and multifunction devices that incorporate multiple functions such as scanning, copying, and printing capabilities in one device. Such printing devices may utilize ink jet, dot matrix, dye sublimation, laser, and any other suitable print formats. The term "button" as used herein means any component, whether a physical component or graphical user interface icon, that is engaged to initiate an action or event.

The term "image" as used herein encompasses any printed or electronic form of text, graphics, or a combination thereof. "Media" or "media sheet" refers to a material that receives a printed image or, with a document to be scanned, a material containing a printed image. The media is said to move along the media path and the media path extensions from an upstream location to a downstream location as it moves from the media trays to the output area of the imaging device. For a top feed option tray, the top of the option tray is downstream from the bottom of the option tray. Conversely, for a bottom feed option tray the top of the option tray is upstream from the bottom of the option tray. As used herein, the leading edge of the media is that edge which first enters the media path in a media process direction and the trailing edge of the media is that edge that last enters the media path. Depending on the orientation of the media in a media tray, the leading/trailing edges may be the short edge of the media or the long edge of the media, in that most media are rectangular. As used herein, the term "media width" refers to the dimension of the media that is transverse to the direction of the media path. The term "media length" refers to the dimension of the media that is aligned to the direction of the media path. "Media process direction" describes the movement of media within the imaging system as is generally meant to be from an input toward an output of the imaging system. Further relative positional terms may be used herein. For example, "superior" means that an element is above another element. Conversely "inferior" means that an element is below or beneath another element Media is conveyed using pairs of aligned rolls forming feed nips. The term "nip" is used in the conventional sense to refer to the opening formed between two rolls that are located at about the same point in the media path. The rolls forming the nip may be separated apart, be tangent to each other, or form an interference fit with one another. With this nip type, the axes of the rolls are parallel to one another and are typically, but do not have to be, transverse to the media path. For example, a deskewing nip may be at an acute angle to the media feed path. The term "separated nip" refers to a nip formed between two rolls that are located at different points along the media path and have no common point of tangency with the media path. Again, the axes of rotation of the rolls having a separated nip are parallel but are offset from one another along the media path. Nip gap refers to the space between two rolls. Nip gaps may be positive, where there is an opening between the two rolls, zero where the two rolls are tangentially touching or negative where there is an interference fit between the two rolls.

As used herein, the term "communication link" is used to generally refer to a structure that facilitates electronic communication between multiple components. While several communication links are shown, it is understood that a single communication link may serve the same functions as the multiple communication links that are illustrated. Accordingly, a communication link may be a direct electrical wired connection, a direct wireless connection (e.g., infrared or r.f.), or a network connection (wired or wireless), such as for example, an Ethernet local area network (LAN) or a wireless networking standard, such as IEEE 802.11. Devices interconnected by a communication link may use a standard communication protocol, such as for example, universal serial bus (USB), Ethernet or IEEE 802.xx, or other communication protocols.

Referring now to the drawings and particularly to FIG. 1, there is shown a diagrammatic depiction of an imaging system 1. As shown, imaging system 1 may include an imaging device 2, and an optional computer 50 communicatively coupled to the imaging device 2. Imaging system 1 may be, for example, a customer imaging system, or alternatively, a development tool used in imaging apparatus design. Imaging device 2 is shown as a multifunction machine that includes a controller 3, a print engine 4, a scanner system 6, a user interface 7, a finisher 8 and/or one or more option assemblies 9.

Controller 3 includes a processor unit and associated memory 10, and may be formed as one or more Application Specific Integrated Circuits (ASICs). Memory 10 may be any volatile or non-volatile memory or combination thereof such as, for example, random access memory (RAM), read only memory (ROM), flash memory and/or non-volatile RAM (NVRAM). Alternatively, memory 10 may be in the form of a separate electronic memory (e.g., RAM, ROM, and/or NVRAM), a hard drive, a CD or DVD drive, or any memory device convenient for use with controller 3. Scanner system 6 may employ scanning technology as is known in the art including for example, CCD scanners, optical reduction scanners or combinations of these and other scanner types. Finisher 8 may include a stapler unit 11, a hole punch unit (HPU) 12, one or more media sensors 13, various media reference and alignment surfaces and an output area 14 for holding finished media. Imaging device 2 may also be configured to be a printer without scanning capability.

In FIG. 1, controller 3 is illustrated as being communicatively coupled with computer 50 via communication link 41. Controller 3 is illustrated as being communicatively coupled with print engine 4, scanner system 6, and user interface 7, via communication links 42-44, respectively. Computer 50 includes in its memory 51 a software program including program instructions that function as an imaging driver 52, e.g., printer/scanner driver software, for image forming device 2. Imaging driver 52 is in communication with controller 3 of imaging device 2 via communication link 41. Imaging driver 52 facilitates communication between imaging device 2 and computer 50. One aspect of imaging driver 52 may be, for example, to provide formatted print data to imaging device 2, and more, particularly, to print engine 4, to print an image. Another aspect of imaging driver 52 may be, for example, to facilitate collection of scanned data from scanner system 6. Computer 50 may provide operating commands to imaging device 2. Computer 50 may be located nearby imaging device 2 or be remotely connected to imaging device 2 via an internal or external computer network.

In some circumstances, it may be desirable to operate imaging device 2 in a standalone mode. In the standalone mode, imaging device 2 is capable of functioning without computer 50. Accordingly, all or a portion of imaging driver 52, or a similar driver, may be located in controller 3 or memory 10 of imaging device 2 so as to accommodate printing and/or scanning functionality when operating in the standalone mode.

Print engine 4, scanner system 6, user interface 7 and finisher 8 may include firmware maintained in memory 10 which may be performed by controller 3 or another processing element. Controller 3 may be, for example, a combined printer, scanner and finisher controller. Controller 3 serves to process print data and to operate print engine 4 and toner cartridge 81 during printing, as well as to operate scanner system 6 and process data obtained via scanner system 6 for printing or transfer to computer 50. Controller 3 may provide to computer 50 and/or to user interface 7 status indications and messages regarding the media, including scanned media and media to be printed, imaging device 2 itself or any of its subsystems, consumables status, etc. Imaging device 2 may also be communicatively coupled to other imaging devices.

Scanner system 6 is illustrated as having an automatic document feeder (ADF) 60 having a media input tray 61 and a media output area 63. Two scan bars 66 may be provided—one in ADF 60 and the other in a base 65—to allow for scanning both surfaces of the media sheet as it is fed from input tray 61 along scan path SP to output area 63.

Print engine 4 is illustrated as including a laser scan unit (LSU) 80, a toner cartridge 81, an imaging unit 82, and a fuser 83, all mounted within image forming device 2. Imaging unit 82 and toner cartridge 81 are supported in their operating positions so that toner cartridge 81 is operatively mated to imaging unit 82 while minimizing any unbalanced loading forces by the toner cartridge 81 on imaging unit 82. Imaging unit 82 is removably mounted within imaging device 2 and includes a developer unit 85 that, in one form, houses a toner sump and a toner delivery system. The toner delivery system includes a toner adder roll that provides toner from the toner sump to a developer roll. A doctor blade provides a metered uniform layer of toner on the surface of the developer roll. Imaging unit 82 also includes a cleaner unit 84 that, in one form, houses a photoconductive drum and a waste toner removal system. Toner cartridge 81 is also removably mounted in imaging device 2 in a mating relationship with developer unit 85 of imaging unit 82. An exit port on toner cartridge 81 communicates with an entrance port on developer unit 85 allowing toner to be periodically transferred from toner cartridge 81 to resupply the toner sump in developer unit 85. Both imaging unit 82 and toner cartridge 81 may be replaceable items for imaging device 2. Imaging unit 82 and toner cartridge 81 may each have a memory device 86 mounted thereon for providing component authentication and information such as type of unit, capacity, toner type, toner loading, pages printed, etc. which is illustrated as being operatively coupled to controller 3 via communication link 42.

The electrophotographic imaging process is well known in the art and, therefore, will be briefly described. During an imaging operation, laser scan unit 80 creates a latent image by discharging portions of the charged surface of photoconductive drum in cleaner unit 84. Toner is transferred from the toner sump in developer unit 85 to the latent image on the photoconductive drum by the developer roll to create a toned image. The toned image is then either transferred directly to a media sheet received in imaging unit 82 from one of media input trays 17 or to an intermediate transfer member and then to a media sheet. Next, the toned image is fused to the media sheet in fuser 83 and sent to an output location 38, finisher 8 or a duplexer 30. One or more gates 39, illustrated as being in operable communication with controller 3 via communication link 42, are used to direct the media sheet to output location 38, finisher 8 or duplexer 30. Toner remnants are removed from the photoconductive drum by the waste toner removal system housed within cleaner unit 84. As toner is depleted from developer unit 85, toner is transferred from toner cartridge 81 into developer unit 85. Controller 3 provides for the coordination of these activities including media movement occurring during the imaging process.

While print engine 4 is illustrated as being an electrophotographic printer, those skilled in the art will recognize that print engine 4 may be, for example, an ink jet printer and one or more ink cartridges or ink tanks or a thermal transfer printer; other printer mechanisms and associated image forming material.

Controller 3 also communicates with a controller 15 in option assembly 9, via communication link 46, provided within each option assembly 9 that is provided in imaging device 2, and a controller 26 in finisher 8 via communication link 45. Controller 15 operates various motors housed within option assembly 9 that position media for feeding, feed media from media path branches PB into media path P or media path extensions PX as well as feed media along media path extensions PX. Controllers 3, 15 control the feeding of media along media path P and control the travel of media along media path P and media path extensions PX. Controller 26 controls various motors housed within finisher 8 as well as various operations of stapler unit 11 and HPU 12. Alternatively, separate controllers may be provided for independently controlling each of stapler unit 11 and HPU 12.

Imaging device 2 and option assembly 9 each also include a media feed system 16 having a removable media input tray 17 for holding media M to be printed or scanned, and a pick mechanism 18, a drive mechanism 19 positioned adjacent removable media input trays 17. Each media tray 17 also has a media dam assembly 20 and a feed roll assembly 21. In imaging device 2, pick mechanism 18 is mechanically coupled to drive mechanism 19 that is controlled by controller 3 via communication link 46. In option assembly 9, pick mechanism 18 is mechanically coupled to drive mechanism 19 that is controlled by controller 3 via controller 15 and communication link 46. In both imaging device 2 and option assembly 9, pick mechanisms 18 are illustrated in a position to drive a topmost media sheet from the media stack M into media dam 20 which directs the picked sheet into media path P or extension PX. Bottom fed media trays may also be used. As is known, media dam 20 may or may not contain one or more separator rolls and/or separator strips used to prevent shingled feeding of media from media stack M. Feed roll assemblies 21, comprised of two opposed rolls feed media from an inferior unit to a superior unit via a slot provided therein.

In imaging device 2, media path P (shown in dashed line) is provided from removable media input tray 17 extending through print engine 4 to output area 38, or, when needed, to finisher 8 or to duplexer 30. Media path P may also have extensions PX and/or branches PB (shown in dotted line) from or to other removable media input trays as described herein such as that shown in option assembly 9. Media path P may include a multipurpose input tray 22 provided on housing 23 of imaging device 2 or incorporated into removable media tray 17 provided in housing 23 and corresponding path branch PB that merges with the media path P within imaging device 2. Along media path P and its extensions PX are provided media position sensors 24, 25-1, 25-2 which are used to detect the position of the media, usually the leading and trailing edges of the media, as it moves along the media path P or path extension PX. Media position sensor 24 is located adjacent to the point at which media is picked from each of media trays 17 while media position sensors 25-1, 25-2 are positioned further downstream from their respective media tray 17 along media path P or path extension PX. Media position sensor 25-1 also accommodates media fed along path branch PB from multipurpose media tray 22. Media position sensor 25-2 is illustrated at a position on path extension PX downstream of media tray 17 in option assembly 9. Additional media position sensors may be located throughout media path P and a duplex path, when provided, and their number and positioning is a matter of design choice. Media position sensors 24, 25-1, 25-2 may be an optical interrupter or a limit switch or other type of edge detector as is known to a person of skill in the art and detect the leading and trailing edges of each sheet of media as it travels along the media path P, path branch PB or path extension PX.

Media type sensors 27 are provided in image forming device 2 and each option assembly 9 to sense the type of media being fed from removable media input trays 17. Media type sensor 27 may include a light source, such as an LED and two photoreceptors. One photoreceptor is aligned with the angle of reflection of the light rays from the LED to receive specular light reflected from the surface of the sheet of media and produces an output signal related to amount of specular light reflected. The other photoreceptor is positioned off of the angle of reflection to receive diffuse light reflected from the surface of the media and produces an output related to the amount of diffused light received. Controller 3, by ratioing the output signals of the two photoreceptors at each media type sensor 27, can determine the type of media in the respective media tray 17.

Media size sensors 28 are provided in image forming device 2 and each option assembly 9 to sense the size of media being fed from removable media input trays 17. To determine media sizes such as Letter, A4, A6, Legal, etc., media size sensors 28 detect the location of adjustable trailing edge media supports and, in some imaging devices, one or both adjustable media side edge media supports provided within removable media input trays 17 as is known in the art. Sensors 24, 25-1, 25-2, 27, and 28 are shown in communication with controller 3 via communication link 47.

Figure 2:
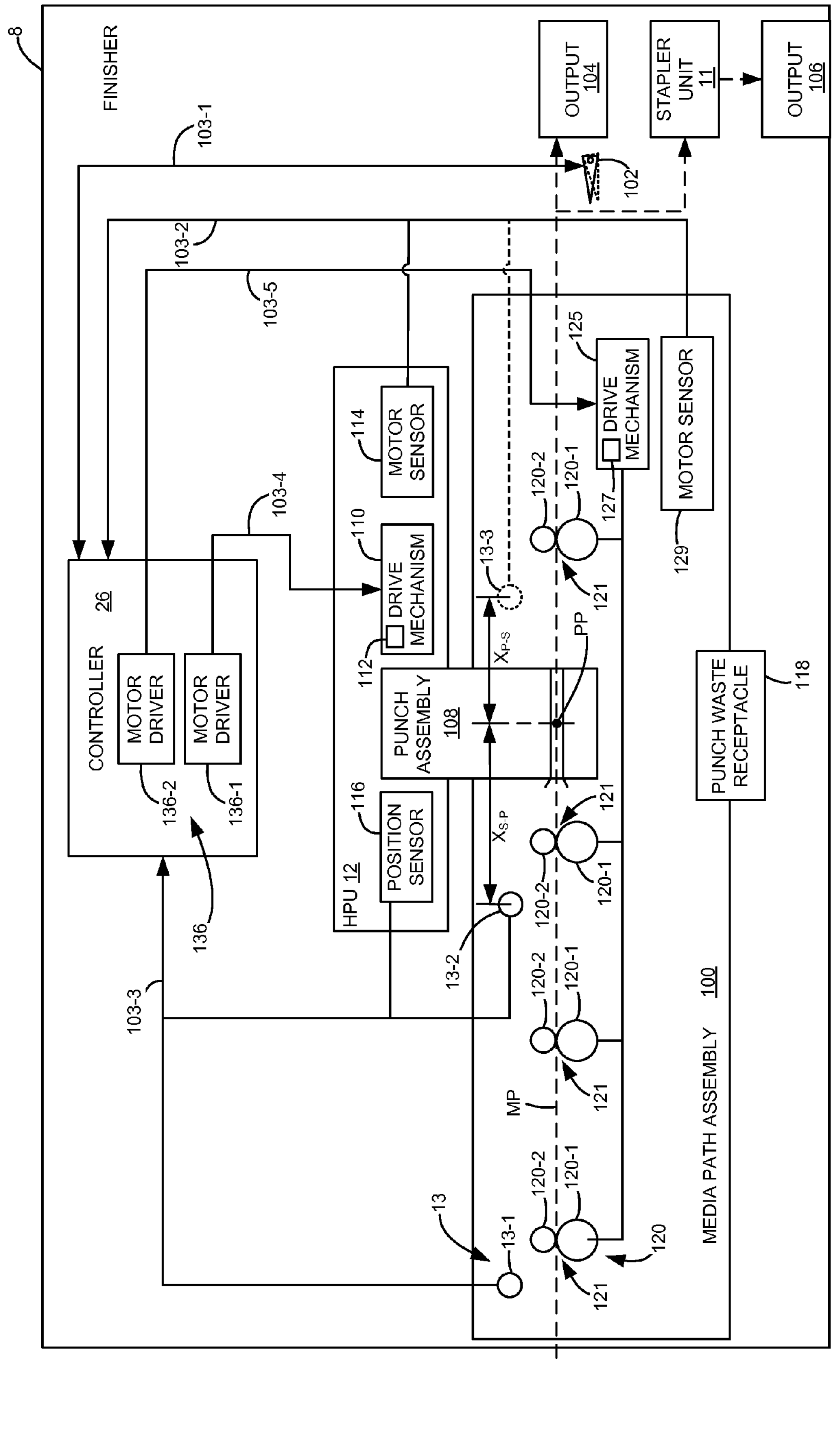
FIG. 2 is a schematic illustration of a finisher of the imaging device in FIG. 1 according to one example embodiment.

Referring now to FIG. 2, a schematic block diagram showing finisher 8 including controller 26, hole punch unit (HPU) 12, stapler unit 11, and a media path assembly 100, is illustrated. Generally, finisher 8 includes a media path MP therein defined by the media path assembly 100 that receives printed media sheets directed by gate 39 of imaging device 2 into finisher 8 for at least one of a hole punching operation by HPU 12 and a stapling operation by stapler unit 11. In the example shown, stapler unit 11 is positioned downstream of HPU 12 to allow media sheets punched by HPU 12 to be stapled by stapler unit 11. One or more gates gate 102, illustrated as being in operable communication with controller 26 via communication link 103-1, are used to selectively direct media sheets to stapler unit 11 if stapling is required, or to an output location 104 if stapling is not required. Meanwhile, if finishing requires only stapling of media sheets, HPU 12 may be disabled so that media sheets conveyed along media path MP pass by HPU 12 and are directed into stapler unit 11 without undergoing a punching operation. Positioned downstream of stapler unit 11 is an output location 106 which receives stapled media sheets from stapler unit 11.

HPU 12 includes a hole punch assembly 108 that defines a punch point PP along media path MP. Punch point PP is the location in punch assembly 108 at which one or more holes will be punched through a media sheet advancing along media path MP. When two or more holes are to be punched in a given media sheet, punch assembly 108 would perform the punching operation in a serial manner as the media sheet passes through. Hole punch assembly 108 is operatively coupled to a drive mechanism 110 including a punch motor 112 used to drive hole punch assembly 108 during a punching operation. In an example embodiment, punch motor 112 comprises a DC motor, such as a brushed or brushless DC motor. A motor sensor 114, operatively coupled to punch motor 112 and in operable communication with controller 26 via communication link 103-2, provides a motion feedback signal associated with punch motor 112. Additionally, a position sensor 116, in operable communication with controller 26 via communication link 103-3, provides a position feedback signal of hole punch assembly 108. Underneath hole punch assembly 108 is a punch waste receptacle 118 for collecting waste paper fragments or “chads” that are produced when holes are punched through the media sheet.

Media path assembly 100 includes a plurality of feed roll pairs 120, each pair having opposed rolls 120-1, 120-2 forming feed nips 121 therebetween, spaced along media path MP. The number and placement of feed roll pairs 120 is not a limitation of the present disclosure. As illustrated, each feed roll 120-1 is operatively coupled to a drive mechanism 125 while corresponding feed rolls 120-2 are idler rolls. Drive mechanism 125 includes one or more gear mechanisms (not shown) and a media path motor 127, and is used to drive feed rolls 120-1 to advance media sheets along media path MP. A motor sensor 129, operatively coupled to media path motor 127 and in operable communication with controller 26 via communication link 103-2, provides a motion feedback signal associated with media path motor 127. In an example embodiment, media path motor 127 comprises a DC motor, such as a brushed or brushless DC motor. Drive mechanisms 110, 125 are in operative communication with controller 26 via communication links 103-4, 103-5, respectively.

Media path assembly 100 further includes a plurality of media sensors 13 positioned to detect presence and/or position of media sheets as they advance along media path MP. For example, media sensor 13-1 is positioned adjacent to a media sheet entrance area within finisher 8 to provide signals to controller 3 indicative of a media sheet being initially fed into finisher 8. A second media sensor, media sensor 13-2, is positioned downstream of media sensor 13-1 and at a predetermined distance $X_{S\text{-}P}$ upstream of punch point PP. Media sensor 13-2 may be used to detect a leading edge of the advancing media sheet and provide signals to controller 3 indicative of the media sheet approaching the punch point PP. Distance $X_{S\text{-}P}$ of media sensor 13-2 from the punch point PP may be selected to provide sufficient time for HPU 12 to perform positional error correction between the punch motor 112 and the media path motor 127 during a hole punching operation, as will be explained in greater detail below. In an example embodiment, distance $X_{S\text{-}P}$ may be between about 40 mm and about 90 mm in advance of the punch point PP, such as, for example, about 65 mm. Additionally, a media sensor 13-3 may be optionally provided at a predetermined distance $X_{P-S}$ downstream of punch point PP to act as a hole sensor 13-3 to detect the holes punched through the advancing media sheet. The output signal obtained from hole sensor 13-3 may be used by controller 3 to determine actual hole position on the punched media sheet, and be further used by HPU 12 in performing positional error correction when punching subsequent holes through the media sheet, as will be explained in detail below. Media sensors 13 may comprise any type of sensor mechanism such as, for example, a flag sensor mechanism or an optical sensor mechanism as are known in the art. Media sensors 13-1, 13-2 are in operable communication with controller 3 via communication link 45-3 while media sensor 13-3 is shown in operable communication with controller 3 via communication link 45-2.

One or more motor drivers 136-1, 136-2 may also be provided in controller 26 to energize motors used in drive mechanisms 110, 125. As shown, motor drivers 136-1, 136-2 respectively drive motors 112, 127 in drive mechanisms 110, 125. Motor drivers 136-1, 136-2 may also be configured to measure the current being used by their respective motors and to provide a pulse width modulated drive signal thereto, and/or employ active brake control in which an active excitation or drive current is applied to the coils of respective motors to generate braking torque to allow faster deceleration response of the motors.

Figure 3:
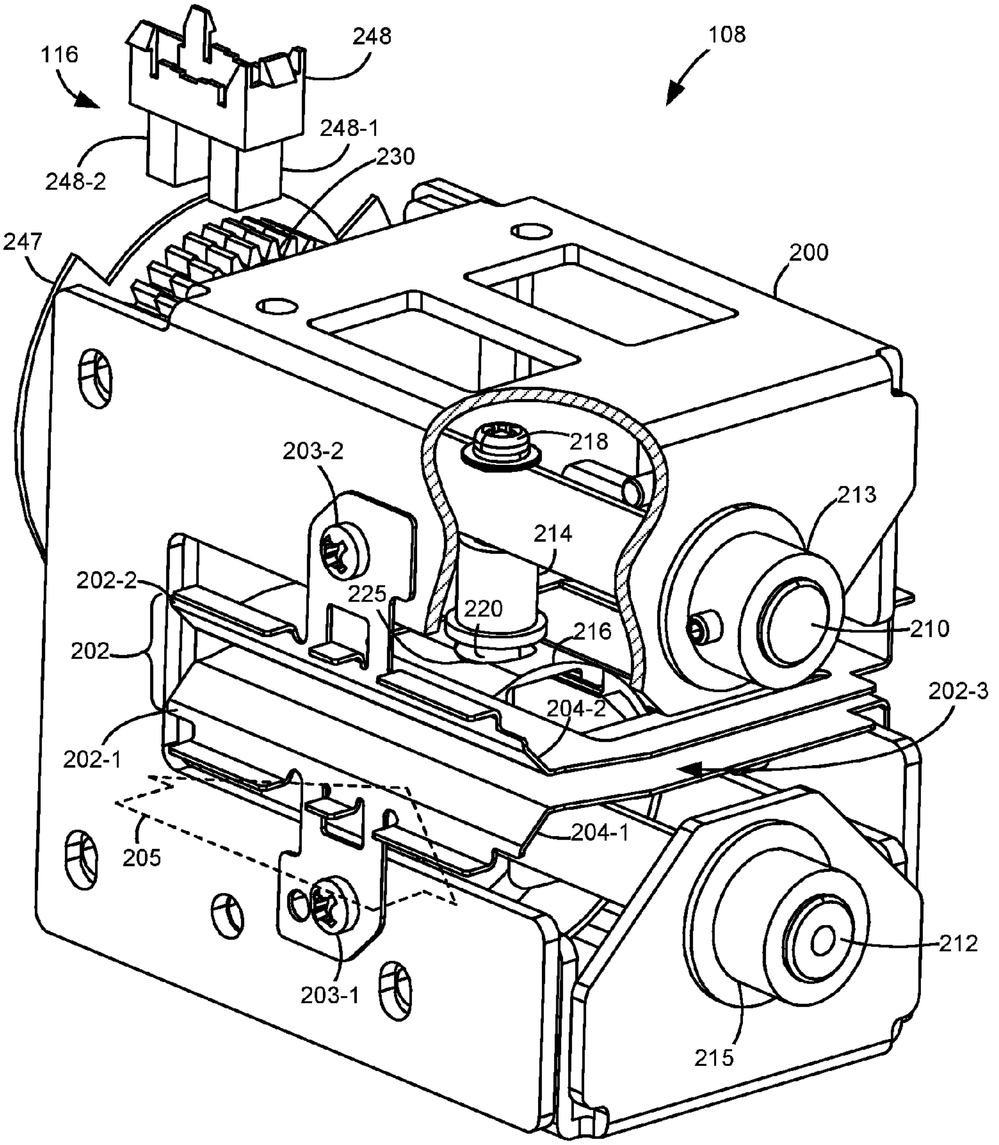
FIG. 3 is a perspective view of a rotary hole punch assembly for the finisher of FIG. 2.
Figure 4:
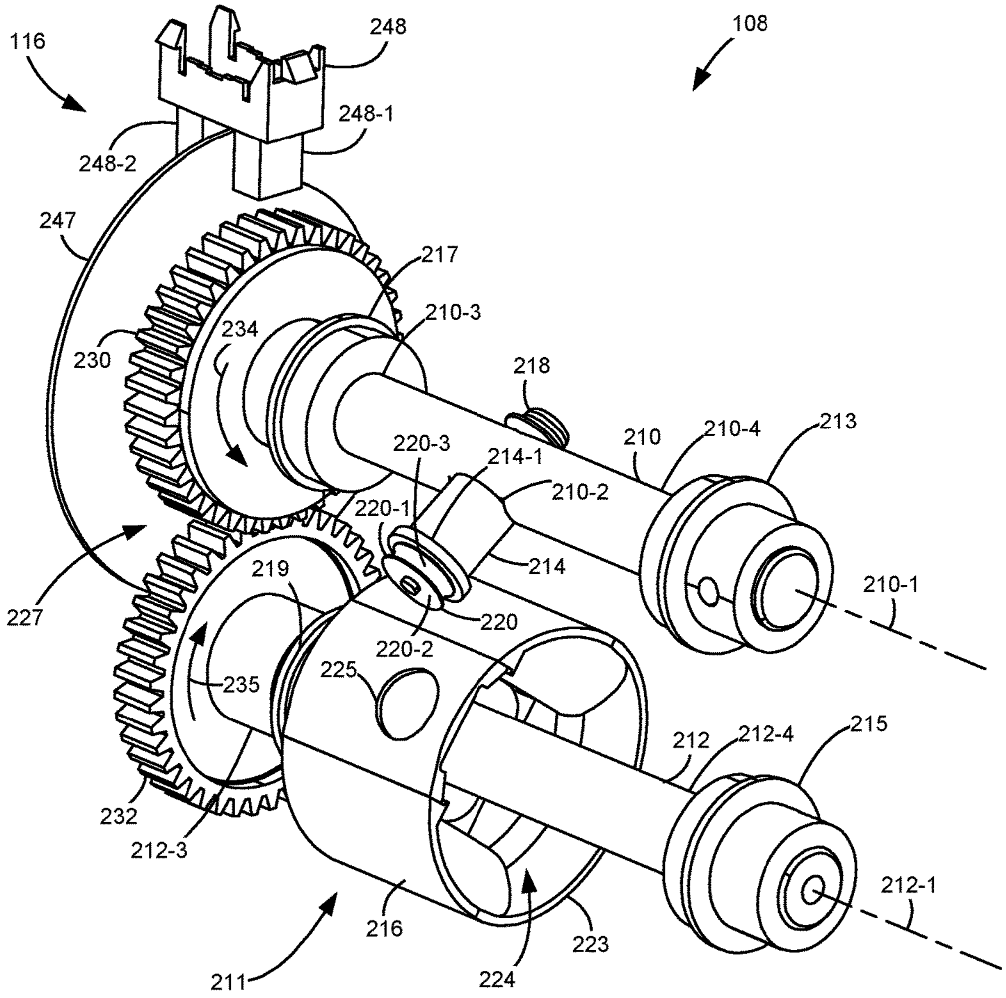
FIG. 4 is a perspective view illustrating interior components of the rotary hole punch assembly shown in FIG. 3.

FIG. 3 illustrates a perspective view of hole punch assembly 108 including a housing 200 that is partially cutaway to show enclosed interior components, and a media guide 202, while FIG. 4 illustrates a perspective view of hole punch assembly 108 with housing 200 and media guide 202 removed. Media guide 202 comprises a pair of opposed guide members 202-1, 202-2 mounted to housing 200, such as by fasteners 203-1, 203-2, respectively, above and below the media path MP. Guide members 202-1, 202-2 are separated to form a gap 202-3 through which media sheets enter hole punch assembly 108. Guide members 202-1, 202-2 define at least a portion of media path MP that receives an edge marginal region of a media sheet in which holes are to be punched therethrough. The gap 202-3 between guide members 202-1, 202-2 may be selected to allow passage of different types and thicknesses of media sheets. Guide members 202-1, 202-2 may further have inclined upstream edge portions 204-1, 204-2, respectively, to smooth the entry of the edge marginal regions of media sheets, indicated by a dashed arrow 205, into hole punch assembly 108.

Figure 7A:
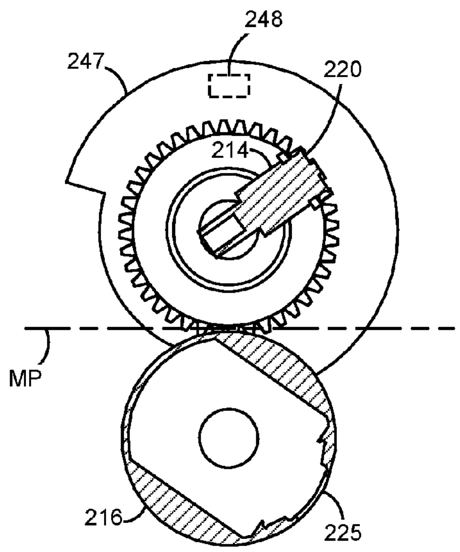
FIGS. 7A-7D illustrate various positions of the rotary hole punch assembly with respect to a media path according to an example embodiment of the present disclosure.
Figure 7B:
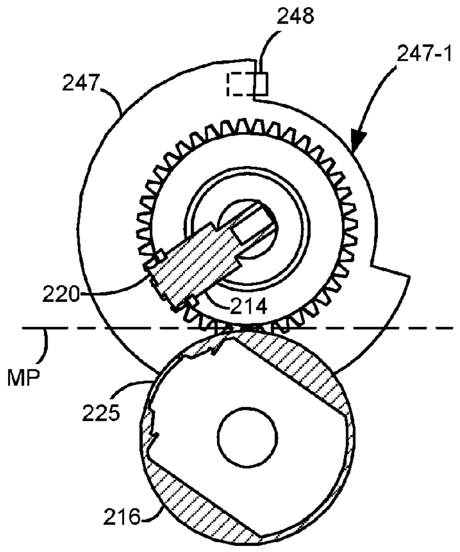
Figure 7C:
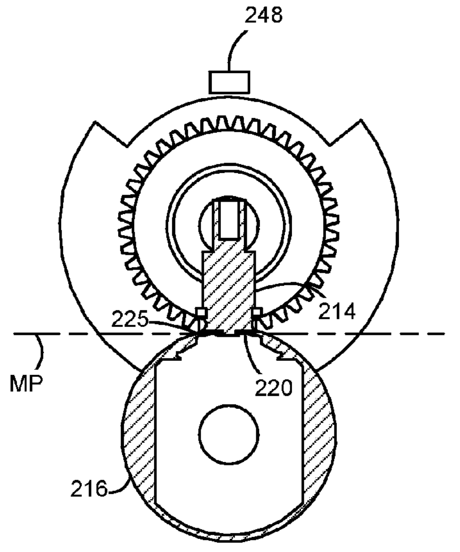

Housing 200 rotatably supports a first shaft 210 and a second shaft 212 extending substantially parallel relative to each other and transverse to the media path MP. As shown, first shaft 210 is mounted above the plane of media path MP while second shaft 212 is mounted below the plane of media path MP. A punch arm 214 radially extends from the first shaft 210 which is rotatable about axis 210-1, while a die 211 is concentrically mounted to second shaft 212 that is rotatable about axis 212-1. In the example shown, punch arm 214 is received into opening 210-2 in first shaft 210 and is removably fastened thereto by a fastener, such as screw 218, to allow for its replacement due to wear. It will be appreciated, though, that punch arm 214 may be adapted to extend from the first shaft 210 using other techniques. Punch arm 214 has a punch head 220 at a free end 214-1 thereof. Die 211 comprises a cylindrical body 216 having a cylindrical wall 223 forming an interior chamber 224 about shaft 212. A hole 225 is provided through cylindrical wall 223. Punch arm 214 radially extends from the first shaft 210 to an extent sufficient to allow punch head 220 to matingly engage die 211 through hole 225 when punch arm 214 is vertically aligned with hole 225 at the punch point PP, such as shown in FIG. 7C. Additionally, punch head 220 has an edge 220-1 and a front face 220-2 having a size that allows it to fit closely into hole 225 so that when punch head 220 is received into hole 225 at punch point PP while a sheet of media is disposed between media guides 202-1, 202-2 and between punch head 220 and die 211, edge 220-1 of punch head 220 can crease the media sheet and shear through the media sheet to create a hole therethrough.

In order to allow punch head 220 and hole 225 to be rotatable to engage the punch point PP at substantially the same time, punch arm 214 and die 211 may be arranged such that punch head 220 and hole 225 are rotatable about respective axes 210-1, 212-1 while maintaining symmetrical positions relative to each other with respect to the plane of the media path MP. For example, in FIGS. 7A-7D described below, various positions of punch head 220 and hole 225 are shown being symmetrically positioned relative to each other with respect to the plane of media path MP. To achieve this functionality, the first shaft 210 and the second shaft 212 may be operatively coupled to each other via a coupling mechanism 227 that causes both punch head 220 and hole 225 to rotate at substantially the same rotational speed in opposite directions. In this example, the coupling mechanism 227 includes a first gear 230 and a second gear 232. First gear 230 attaches to first shaft 210 outboard of housing 200 at first end 210-3 that passes through a corresponding opening provided in housing 200. Second gear 232 attaches to first end 212-3 of second shaft 212 outboard of housing 200 in a similar fashion as first gear 230. Bushings 213, 215 are provided on second ends 210-4, 212-4, respectively, of first and second shafts 210, 212. Bushings 213, 215 are supported by housing 200. Bushings 217, 219 may also be provided where first ends 210-3, 212-3, respectively, pass through housing 200. The first and second gears 230, 232 mesh with each other and have the same diameters to achieve a gear ratio of about 1:1 so that first and second gear 230, 232, and consequently the first and second shafts 210, 212, are rotatable at the same speed, but in opposite directions as indicated by arrows 234, 235. Additionally, corresponding radii of punch head 220 and hole 225 from respective axes 210-1, 212-1 are substantially equal to each other so that punch head 220 and hole 225 can travel at the same rotational velocity and can meet at the punch point PP at substantially the same time. In an example embodiment, radius of each of punch head 220 and hole 225 from respective axes 210-1, 212-1 may be about 16 mm. Further, punch head 220 may have a generally concave side cylindrical surface 220-3 to allow punch head 220 to smoothly transition into, through, and out of hole 225 without getting caught by the wall 223 as both approach and thereafter leave the punch point PP during rotation of punch arm 214 and die 211.

Figure 5:
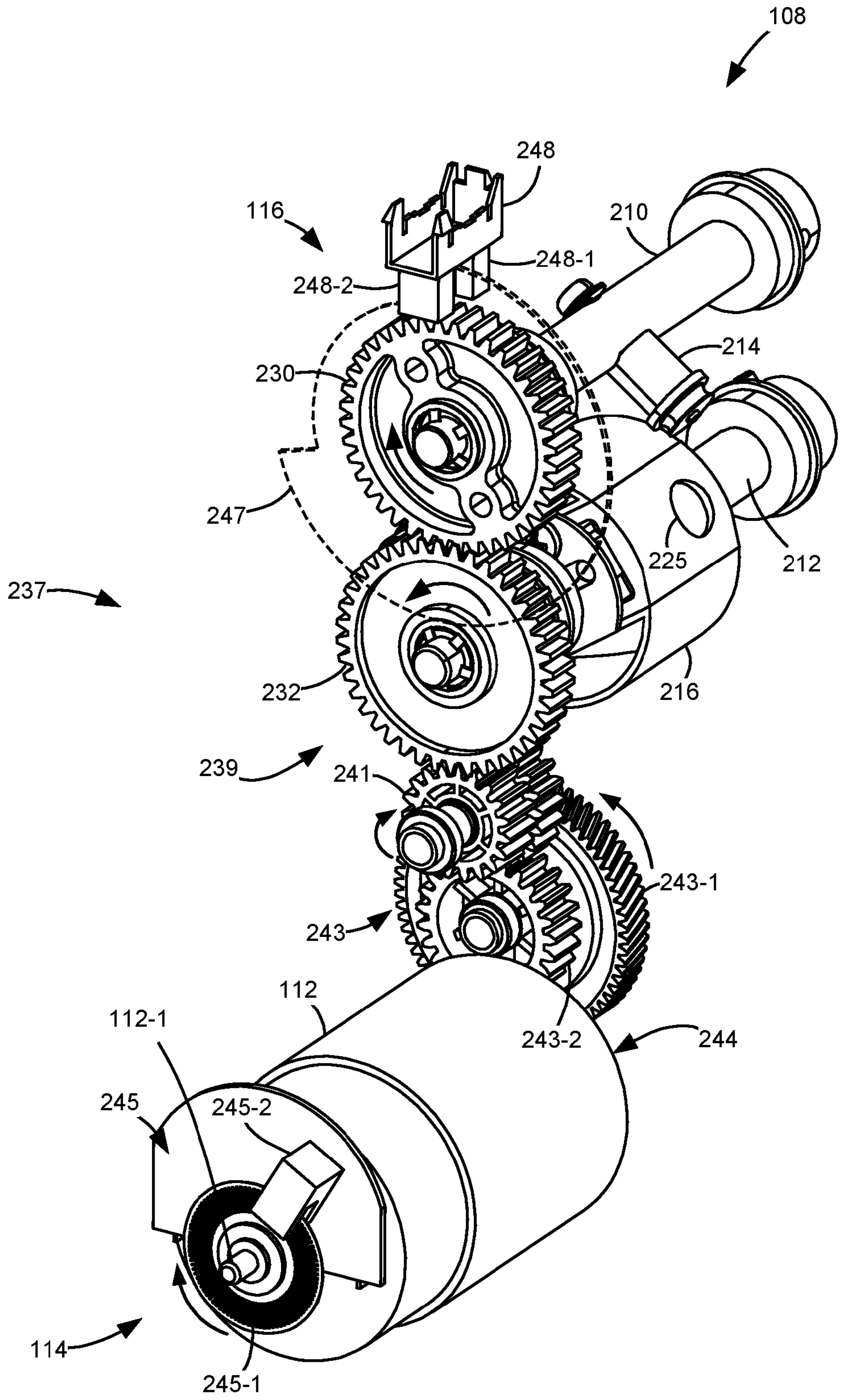
FIG. 5 is a perspective view of the rotary hole punch assembly operatively coupled to a punch motor.

With reference to FIG. 5, second gear 232 is illustrated as being operatively coupled to punch motor 112 via a coupling mechanism 237. In an example embodiment, coupling mechanism 237 may include a gear mechanism or gear train 239 comprising an idler gear 241 and a compound gear 243 that respectively mesh with second gear 232 and a pinion gear 244 on the shaft 112-1 of punch motor 112. Pinion gear 244 is obscured by the body of punch motor 112. Compound gear 243 comprises at least two different diameter gears, such as a first gear 243-1 and a second gear 243-2, that are fixedly attached to each other and rotate together at the same direction and speed. First gear 243-1 is shown having a larger diameter than second gear 243-2. First gear 243-1 of compound gear 243 meshes with the pinion gear 244 of punch motor 112. Idler gear 241 is disposed between second gear 243-2 of compound gear 243 and second gear 232, and meshes therewith. In an example embodiment, a punch motor gear ratio defined by gear train 239 may be about 10:1 such that first and second gear 230, 232, and consequently punch arm 214 and die 211, rotate at a relatively slower rotational speed than pinion gear 243 of punch motor 112. It will be appreciated, however, that other gear ratios may be used to achieve different speed ratios for punch motor 112, and punch arm 214 and die 211. Because second gear 232 is operatively coupled to first gear 230, punch motor 112 can rotate both punch arm 214 and die 211 via coupling mechanism 237.

Figure 6:
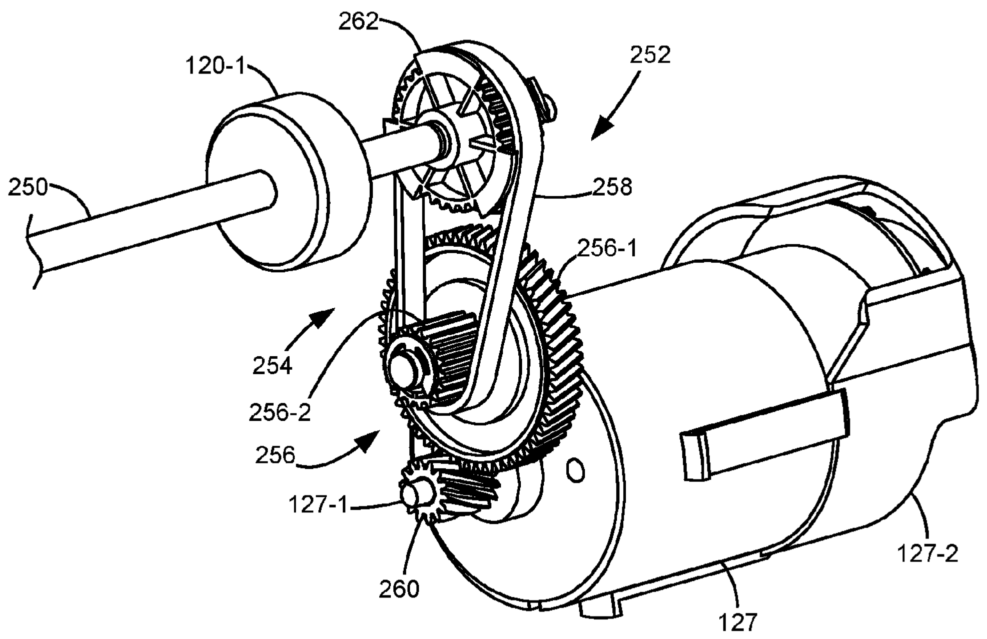
FIG. 6 is a perspective view of a feed roll in a media path assembly operatively coupled to a media path motor.

FIG. 6 illustrates media path motor 127 being operatively coupled to a shaft 250 of feed roll 120-1 via a coupling mechanism 252. In the example embodiment shown, coupling mechanism 252 includes a gear-belt mechanism 254 comprising a compound gear 256 having gears 256-1, 256-2 and a gear belt 258. Gear 256-1 of compound gear 256 meshes with a pinion gear 260 on a shaft 127-1 of media path motor 127, while gear belt 258 connects to gear 256-2 of compound gear 256 with a gear wheel 262 disposed and mounted on an end of shaft 250 of feed roll 120-1. Gear 256-1 and a gear 256-2 of compound gear 256 are fixedly attached to each other and rotate together at the same direction and speed. Gear 256-1 is shown having a larger diameter than gear 256-2. Rotation of compound gear 256 rotates shaft 250 and feed roll 120-1 in the same direction. In an example embodiment, a media path motor gear ratio defined by coupling mechanism 252 may be about 8:1 such that rotation of the pinion gear 260 of media path motor 127 causes rotation of shaft 250, and thus feed roll 120-1, at a slower speed relative to that of the pinion gear 260 of media path motor 127. It will be appreciated, however, that other gear ratios may be used to achieve different speed ratios for media path motor 127 and feed roll 120-1. Further, although not shown, the other feed rolls 120-1 along media path MP may have corresponding shafts that are operatively connected to the feed-roll shaft 250 in FIG. 6 via a variety of coupling mechanisms, which may comprise gear trains, gear wheels, and gear belts, such that each of the feed rolls 120-1 rotate at the same speed and direction when pinion gear 260 of media path motor 127 rotates.

Punch motor 112 is operatively coupled to motor sensor 114 which provides a motion and position feedback signal to controller 3 that is associated with punch motor 112. In the example embodiment shown in FIG. 5, motor sensor 114 comprises an encoder 245 used to measure angular position and speed of the shaft of punch motor 112. Encoder 245 may have a relatively high resolution and, in an example form, may be a quadrature encoder. Encoder 245 comprises an encoder wheel 245-1 mounted on the shaft 112-1 of punch motor 112, and an encoder sensor 245-2 positioned stationary relative to encoder wheel 245-1 and which counts the number of pulses of encoder wheel 245-1 as punch motor 112 rotates. Pulses generated by encoder 245 may be transformed into an amount of rotation of punch motor 112, as well as angular position and/or speed of punch motor 112. As used herein, rotation and position of a motor refers to the rotation and position of the output shaft of the motor. In one example embodiment, motor sensor 129 operatively coupled with media path motor 127 (and enclosed within a rear enclosure 127-2 of media path motor 127 in FIG. 6) is of a similar type as motor sensor 114 used with punch motor 112, and is used to determine linear speeds of a media sheet being advanced along media path MP. Alternatively, other suitable sensors may be used for providing a position and motion feedback signal associated with punch motor 112 and media path motor 127.

Figure 7D:
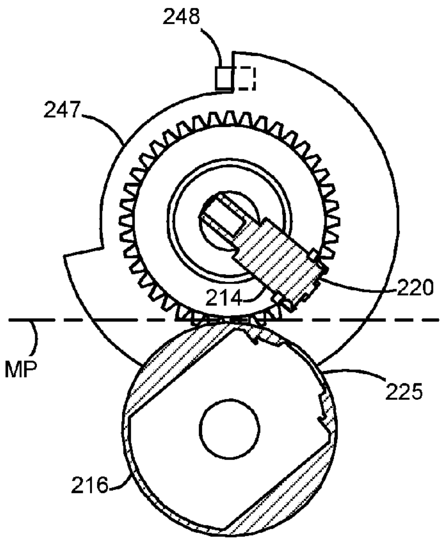

HPU 12 may further include position sensor mechanism 116 associated with punch arm 214 for detecting its angular position. In the example embodiment shown, position sensor mechanism 116 comprises a flag 247, shown as a circular disk having circumferential cutout portions in dashed line in FIG. 5, attached to first gear 230 and/or first shaft 210, and an optical sensor 248 disposed adjacent flag 247. Flag 247 is rotatable with first gear wheel 230 and/or first shaft 210 so that as the position of punch arm changes, the outer portion of flag 247 is rotated between a transmitter 248-1 and a receiver 248-2 of optical sensor 248. With further reference to FIGS. 7A-7D, the various positions of punch arm 214 are shown having corresponding portions of flag 247 relative to optical sensor 248. The optical path between the transmitter 248-1 and receiver 248-2 of optical sensor 248 is either blocked or unblocked by various portions of flag 247. This provides an output signal from optical sensor 248 to controller 3 to indicate the position of punch arm 214. Optical sensor 248 is shown positioned about 12 o'clock with respect to the plane of media path MP. For example, in FIG. 7A, punch arm 214 is at a first position that is about 2 o'clock with respect to the plane of media path MP where flag 247 blocks the optical path of optical sensor 248. As punch arm 214 rotates counter-clockwise and reaches a second position at about 7 o'clock as shown in FIG. 7B, flag 247 is rotated such that a cutout portion 247-1 thereof arrives at optical sensor 248 allowing the optical path to be unblocked, causing a change in an output signal of optical sensor 248 which indicates that the punch arm has reached the second position. As flag 247 continues to rotate counter-clockwise, cutout portion 247-1 continues to pass through optical sensor 248 leaving the optical path of optical sensor 248 unblocked as punch arm 214 further rotates counter-clockwise from the second position to a third position shown in FIG. 7C. In the third position, the punch arm 214 arrives at the punch point PP at which punch head 220 engages hole 225 of die 211. In FIG. 7D, punch arm 214 is rotated counter-clockwise from the third position to a fourth position at about 5 o'clock. At the fourth position, the optical path of optical sensor 248 is again blocked by flag 247 causing a change in the output signal of optical sensor 248 and indicating that punch arm 214 has reached the fourth position. The optical path of optical sensor 248 remains blocked by flag 247 until punch arm 214 reaches the first position in FIG. 7A at which point the cycle will repeat. As shown, the optical path of optical sensor 248 is unblocked by flag 247 during the rotation of punch arm 214 from the second position through the fourth position. The circumferential length of cut-out portion 247-1 determines the location of the second and fourth positions during a rotational cycle. As illustrated, the cut-out portion 247-1 spans about 90 degrees of rotation of flag 247. As will be appreciated, reverse logic to that described above may also be implemented, or any other suitable sensor for detecting position of punch arm 214 may be used. In addition or in the alternative, since punch motor 112 drives punch arm 214 to rotate, the sequence of pulses generated by encoder 245 may be processed by controller 3 and transformed into a change in angular position of the punch arm 214, and/or a change in the position of punch head 220.

Figure 8:
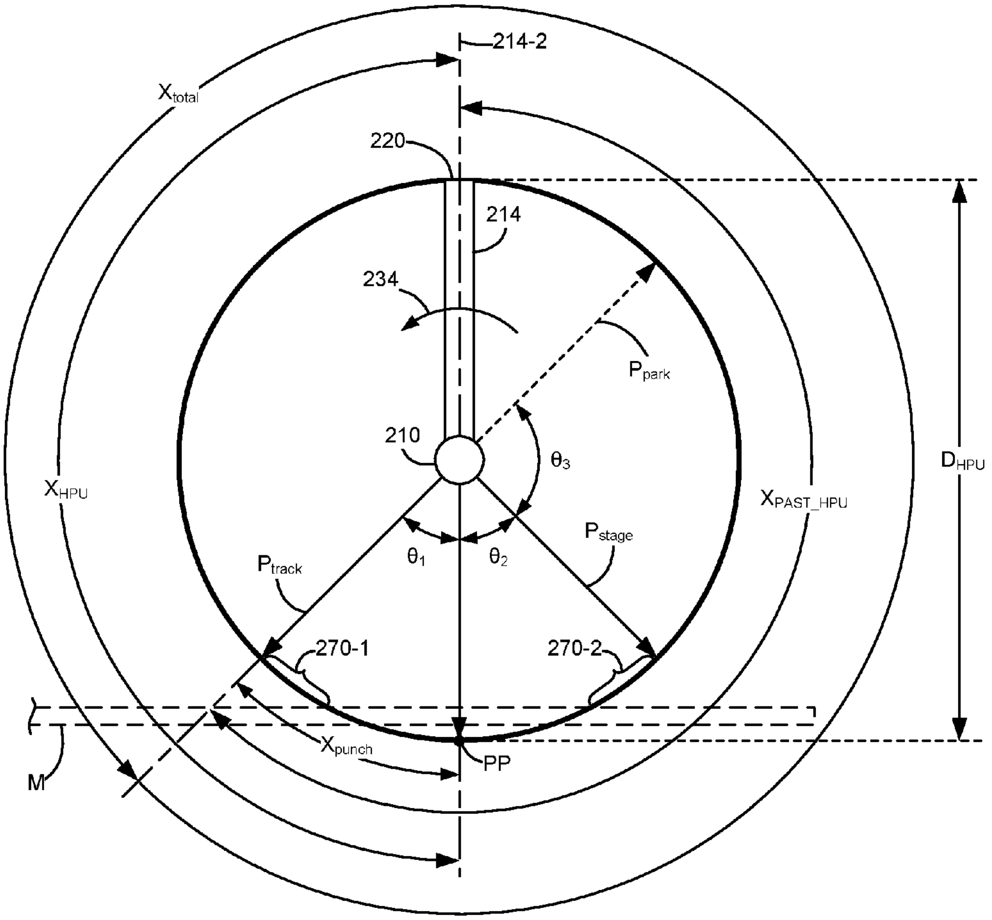
FIG. 8 illustrates the positions shown in FIGS. 7A-7D in a diagrammatic representation of a rotational punching cycle of a punch arm of the rotary hole punch assembly according to an example embodiment of the present disclosure.

The arrangements shown in FIGS. 7A-7D further depict functional positions of punch arm 214. In FIG. 8, the functional positions of punch arm 214 are illustrated in a diagrammatic representation of a rotational punching cycle in a direction indicated by arrow 234, which is illustrated as being counter-clockwise. The first position of punch arm 214 shown in FIG. 7A corresponds to an angular park position $P_{park}$ at which punch arm 214 is stationed when punch assembly 108 is not in use. Proceeding counterclockwise, the second position (FIG. 7B) corresponds to an angular track position $P_{track}$, the third position (FIG. 7C) corresponds to an angular punch position $P_{punch}$ which is coincident with the punch point PP, and the fourth position (FIG. 7D) corresponds to an angular stage position $P_{stage}$. Track position $P_{track}$ may be at an angle $\theta_1$, such as less than about 90 degrees, and more particularly less than about 50 degrees, before the punch position $P_{punch}$ at which punch head 220 arrives at the punch point PP. Stage position $P_{stage}$ occurs between angular punch position $P_{punch}$ and angular park position $P_{park}$ and may be at an angle $\theta_2$, such as less than about 90 degrees, and more particularly less than about 50 degrees, after the punch position $P_{punch}$. Park position $P_{park}$ may be at an angle $\theta_3$ after stage position $P_{stage}$. In one example embodiment, $P_{park}$ may be a dynamic position and can be anywhere after $P_{stage}$ and before $P_{track}$ relative to the direction of rotation 234 of punch arm 214, as long as its position, and thus position of punch arm 214, is known. As will be explained in greater detail below, the angular functional positions of punch arm 214 described herein are generally used to determine methods with which to control punch motor 112 as a media sheet is advanced along media path MP into punch assembly 108 for a punching operation. Further, the described angular positions may be selected to accommodate needs of such methods and operational parameters of imaging device 2.

In accordance with example embodiments of the present disclosure, a closed-loop control system is used to operate punch assembly 108. As a media sheet advances along media path MP into punch assembly 108 for punching one or more holes therethrough at one or more punch locations on the media sheet, motion feedback signals associated with punch motor 112 and media path motor 127 are obtained and utilized in varying a drive signal applied to punch motor 112 to rotate punch arm 214 so that punch head 220 arrives at the punch point PP at substantially the same time as a punch location on the advancing media sheet arrives at the punch point PP. Generally, a single hole can be punched through the advancing media sheet during one rotational punching cycle of punch arm 214. Multiple punching cycles would be needed for multiple holes, for example, three hole punches are needed when the media is to be stored in a 3-ring binder. During one portion of the punching cycle, position correction control is performed between punch motor 112 and media path motor 127 to correct error between a circumferential position distance of punch head 220 and a position distance of the punch location on the advancing media sheet from the punch point PP allowing the punch head 220 and the punch location to arrive substantially simultaneously at the punch point PP. During another portion of the punching cycle within which actual punching of the hole through the punch location occurs, speed tracking between the punch motor 112 and media path motor 127 is performed so that linear speeds of the rotating punch head 220 and the advancing media sheet substantially match with each other as the punch head 220 and the punch location approach and thereafter leave the punch point PP. As used herein, substantially matching speeds between punch head 220 and advancing media sheet means that the speed of punch head 220 is the same or slightly slower or faster than the speed of the advancing media sheet. It will be understood that the rotational speed of punch head 220 will be converted into a corresponding linear speed in order to perform this matching of linear speeds.

Figure 9A:
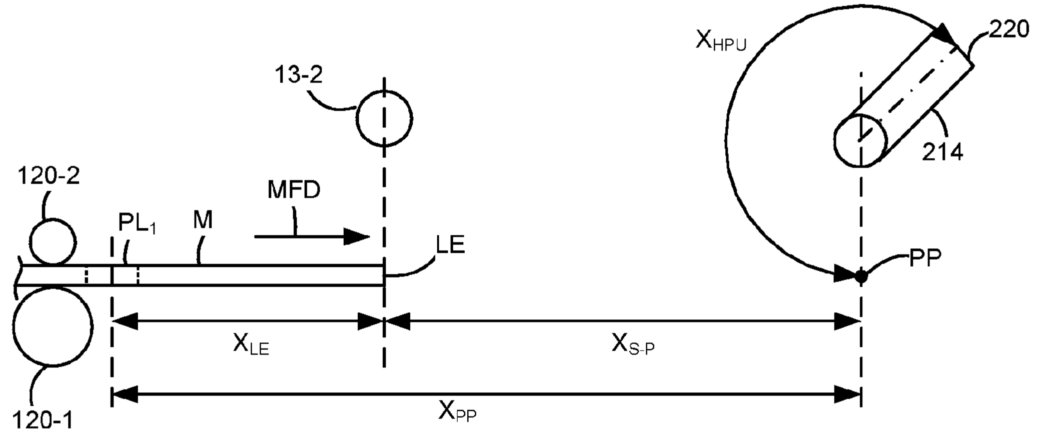
FIGS. 9A-9E illustrate sequential actions of the punch arm as a media sheet is advanced along media path in media feed direction towards a punch point for a punching operation.

Operation of punch assembly 108 will now be described with reference to FIGS. 9A-9F illustrating sequential actions of punch arm 214 as a media sheet M is advanced by feed roll pair(s) 120 along media path MP in media feed direction MFD toward the punch point PP for a punching operation. Punch arm 214 is initially stationed at the park position $P_{park}$ as shown in FIG. 9A. When the output signal of media sensor 13-2 changes states indicating that media sensor 13-2 has detected a leading edge LE of advancing media sheet M, counter-clockwise rotation of punch arm 214 is initiated by controller 3 and motor driver 136-1. Positional error correction is performed to correct a position error of punch head 220 relative to a predetermined first punch location $PL_1$ on media sheet M. In an example embodiment, first punch location $PL_1$ may occur at about 45 mm from the leading edge LE of media sheet M.

Position error is determined by comparing a circumferential travel distance of punch head 220 to the punch point PP, designated by $X_{HPU}$, with a linear travel distance of punch location $PL_1$ to the punch point PP, designated by $X_{PP}$. In one example embodiment, $X_{PP}$ may be determined using Equation 1:

$$X_{PP}=X_{LE}+X_{S\text{-}P}+nX_{HH}-X_{PAST\_PP} \quad \text{Eq. 1}$$

where $X_{LE}$ is the distance of the first punch location $PL_1$ from leading edge LE of media sheet M;

$X_{S\text{-}P}$ is the distance between media sensor 13-2 and the punch point PP;

$n=0, 1, 2, \ldots, N$ for respective punch locations $PL_1$, $PL_2$, $PL_3$, . . . , $PL_N$;

$X_{HH}$ is the distance between sequential punch locations $PL_n$ and $PL_{n+1}$; and, $X_{PAST\_PP}$ is the distance traveled by the media sheet M after triggering media sensor 13-2.

The range of values for $X_{HH}$ depends upon the gear ratio of gear-belt mechanism 254 of media path motor 127 and the gear ratio of gear train 239 of punch motor 112. More particularly, a desired $X_{HH}$ can be achieved by controlling the ratio of speeding between punch arm 214 and the media sheet M, which are dependent on the punch motor gear ratio and the media path motor gear ratio, respectively. For example, for a given process speed for media sheet M, slowing down the rotation of the punch arm 214 results in relatively larger $X_{HH}$. Conversely, increasing the speed of rotation of the punch arm 214 results in relatively smaller $X_{HH}$. In one example embodiment, the distance $X_{HH}$ can be set according to user preference and may be between about 45 mm and about 150 mm.

Figure 9B:
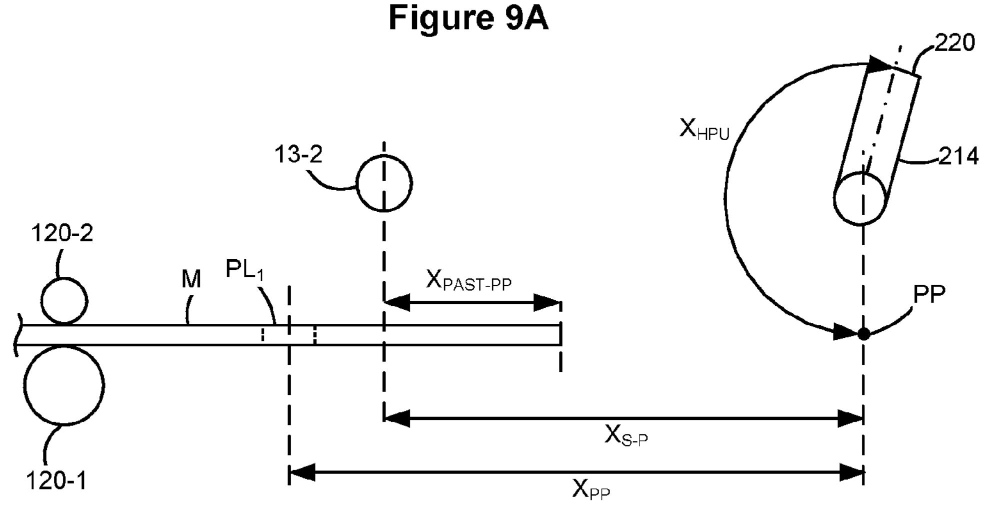
Figure 9C:
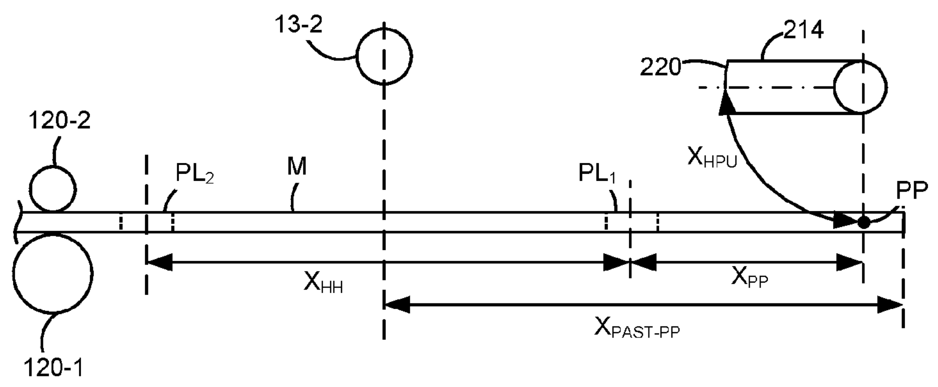

In FIG. 9A, when leading edge LE of media sheet M is initially detected by media sensor 13-2, $X_{PP}$ is determined by the sum of $X_{LE}$ and $X_{S\text{-}P}$. Thereafter, as media sheet M advances as shown in FIGS. 9B and 9C, distance of leading edge LE is $X_{PAST\_PP}$ from media sensor 13-2. In one example embodiment, $X_{PAST\_PP}$ may be determined using the feedback signal from motor sensor 129 associated with media path motor 127. In particular, a rotational position of media path motor 127 when media sensor 13-2 is triggered, determined using the feedback signal provided by motor sensor 129, may be converted into a linear distance traveled by media sheet M. For example, rotational position $X_{PAST\_PP}$ may be expressed as set forth in Equation 2:

$$X_{PAST\_PP} = pos_{PP}\left(\frac{D_{PP}/2}{GR_{PP}}\right) \quad \text{Eq. 2}$$

where $pos_{PP}$ is the media path motor 127 rotational position (in radians);

$D_{PP}$ is the roller diameter of a driven feed roll 120-1; and, $GR_{PP}$ is the media path motor gear ratio defined by gear-belt mechanism 254 of media path motor 127.

$X_{HPU}$ may be determined using Equation 3:

$$X_{HPU}=X_{total}+X_{punch}-X_{PAST\_HPU} \quad \text{Eq. 3}$$

where $X_{total}$ is the total circumferential travel distance of punch head 220 for one rotational cycle of punch arm 214;

$X_{punch}$ is the circumferential travel distance of punch head 220 from the track position $P_{track}$ to the angular punch position $P_{punch}$; and, $X_{PAST\_HPU}$ is the circumferential travel distance of punch head 220 from the track position $P_{track}$ to its current position within one rotational cycle.

In an example embodiment, $X_{PAST\_HPU}$ is set to zero every time punch arm 214 arrives at the position Ptrack. Referring back to FIG. 8, relationships between $X_{HPU}$, $X_{total}$, $X_{punch}$, and $X_{PAST\_HPU}$ are illustrated for a given example position of punch arm 214. As illustrated, the distance measurements $X_{HPU}$, $X_{total}$, $X_{punch}$, and $X_{PAST\_HPU}$ associated with the movement of punch arm 214 are taken relative to a centerline 214-2 thereof. In one example embodiment, $X_{PAST\_HPU}$ may be determined using the feedback signal from motor sensor 114 associated with punch motor 112. For example, a rotational position of punch motor 112 relative to track position $P_{track}$ can be determined using the feedback signal provided by motor sensor 114 and converted into a circumferential distance traveled by punch head 220 after track position $P_{track}$, by using Equation 4:

$$X_{PAST\_HPU} = pos_{HPU}\left(\frac{D_{HPU}/2}{GR_{HPU}}\right) \quad \text{Eq. 4}$$

where $pos_{HPU}$ is the punch motor 112 rotational position (in radians);

$D_{HPU}$ is the diameter of the circular path of punch head 220 (FIG. 8) which corresponds to twice the radius of punch arm 214; and, $GR_{HPU}$ is the punch motor gear ratio defined by gear train 239 of punch motor 112.

Once the linear travel distance $X_{PP}$ of first punch location $PL_1$ and the circumferential travel distance $X_{HPU}$ of punch head 220 toward punch position PP have been determined, position error is calculated based on a difference between $X_{PP}$ and $X_{HPU}$. The calculated position error is then used to determine a speed at which to rotate punch motor 112 to reduce the position error towards zero. In an example embodiment, a tolerance of about ±0.5 mm, or about ±0.1 mm, about zero may be provided.

In order to determine the rotational speed for punch motor 112, a command linear speed of punch motor 112 may be calculated based on the position error, such as by using Equation 5:

$$V_{HPU}=(V_{PP}*\%\ PS)+(X_{HPU}-X_{PP})K_P \quad \text{Eq. 5}$$

where $V_{HPU}$ is the commanded linear speed of the punch motor;

$V_{PP}$ is the linear speed of the media sheet;

% PS is percent process speed;

$X_{HPU}-X_{PP}$ corresponds to the position error; and, $K_P$ is the error correction proportional gain.

In an example embodiment, a radian speed of media path motor 127, determined using the feedback signal provided by motor sensor 129, may be converted into the linear speed $V_{PP}$ of the media sheet M as set forth, for example, in Equation 6:

$$V_{PP} = \omega_{PP}\left(\frac{D_{PP}/2}{GR_{PP}}\right) \quad \text{Eq. 6}$$

where $\omega_{PP}$ is the rotational speed of media path motor 127 (in radians/sec);

$D_{PP}$ is the diameter of driven feed roll 120-1; and, $GR_{PP}$ is the media path motor gear ratio defined by gear-belt mechanism 254 of media path motor 127.

In an example embodiment, a value of Kp may be determined using the Zeigler-Nichols method as is known in the art. In one example, a value for Kp may be selected at about 40. It will be appreciated, however, that other techniques may be utilized for determining Kp, and that other values for Kp may be used depending on particular system designs to achieve desired velocity responses. As can be observed in Equation 5, the commanded linear speed $V_{HPU}$ of punch motor 112 is obtained by introducing a position error correction value, obtained by applying the proportional gain $K_P$ to the determined position error, to the linear speed $V_{PP}$ of the media sheet M. In an example embodiment, percent process speed % PS may be included as a multiplication factor for the linear speed $V_{PP}$, as shown in Equation 5, to control the radian speed of punch motor 112 in relation to media path motor 127. For example, percent process speed % PS may be about one percent less than the process speed to account for the possibility of punch head 220 imposing damage on media sheet M while both are in contact with each other. More particularly, tolerance variations and other external factors may result in performance variations of HPU 12. By applying such percent process speed % PS to obtain $V_{HPU}$, punch head 220 is allowed to move slightly slower than the media sheet M such that while punch head 220 is in contact with the faster moving media sheet M, the pliability of media sheet M would allow it to buckle along media path MP and, consequently, prevent punch head 220 from causing damage or tearing up media sheet M. Accordingly, variations in HPU 12 can be accounted for and good hole quality can be ensured. Of course, other suitable values for % PS are contemplated.

Once the commanded linear speed $V_{HPU}$ of punch motor 112 is determined, it is transformed into a rotational speed for punch motor 112, which can be expressed as set forth by Equation 7:

$$\omega_{HPU} = V_{HPU}\left(\frac{GR_{HPU}}{D_{HPU}/2}\right) \quad \text{Eq. 7}$$

Accordingly, the drive signal applied to punch motor 112 is varied to adjust its speed at the calculated rotational speed $\omega_{HPU}$. Additionally, if the calculated rotational speed $\omega_{HPU}$ exceeds a predetermined maximum commanded speed $\Omega_{max}$ or is below a predetermined minimum commanded speed $\Omega_{min}$, commanded rotational speed $\omega_{HPU}$ may be driven to the maximum or minimum predetermined commanded speeds $\Omega_{max}$, $\Omega_{min}$, respectively, to ensure that punch motor 112 operates within the limitations of the system. The rotational speed of punch motor 112 is thereby varied to correct the position error between the punch motor 112 and media path motor 127. After such correction, a remaining circumferential travel distance of punch head 220 to punch point PP is substantially matched with a remaining travel distance of the punch location $PL_1$ to punch point PP. As such, error between $X_{HPU}$ and $X_{PP}$ approaches zero such that both travel distances would substantially match with each other.

Position error correction may be performed continuously after punch arm rotates from the stage position $P_{stage}$ such that the position distance of punch head 220 is continuously corrected to match the position distance of the punch location $PL_n$ from the punch point PP. In one example, remaining travel distances of the punch location $PL_n$ and punch head 220 may be sampled every 1 millisecond when performing position error correction. Thus, the speed of punch motor 112 may be varied to rotate punch arm 214 such that the travel distances of punch head 220 and punch location $PL_n$ with respect to punch point PP substantially match or track together. By continuously performing error correction, disturbances in the HPU 12 and/or media path assembly 100 measured by the various sensors therein can be accounted for to ensure $X_{HPU}$ and $X_{PP}$ would remain substantially matched with each other as the punch head 220 and each punch location $PL_n$ on the media sheet M move towards the punch point PP.

Figure 9D:
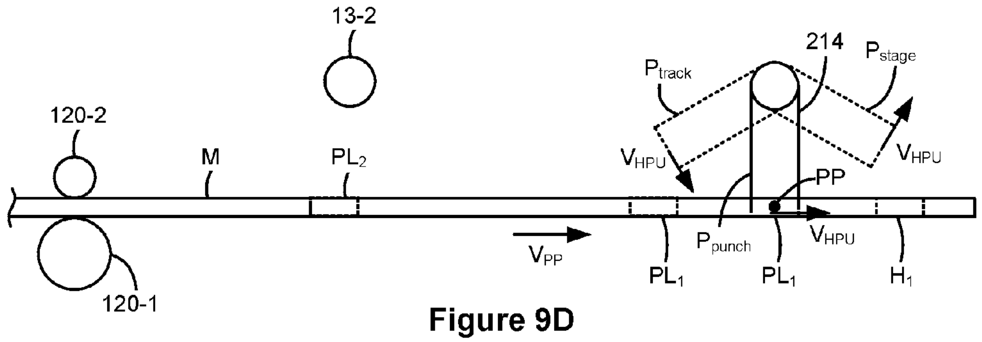

In one example embodiment, position error correction may be continuously performed until punch arm 214 reaches the track position $P_{track}$, as shown in FIG. 9D. Once the track position $P_{track}$ is reached, speed tracking between media path motor 127 and punch motor 112 may commence. More particularly, the speed of punch motor 112 is adjusted to drive punch arm 214 to rotate at a rotational speed that causes a linear speed $V_{HPU}$ of punch head 220 to substantially follow the linear speed $V_{PP}$ of the media sheet M. The rotational speed of punch arm 214 that achieves matching linear speeds between punch head 220 and advancing media sheet M can be obtained by transforming the linear speed $V_{PP}$ of the media sheet M into a commanded rotational speed for punch motor 112, such as by using Equation 8:

$$\omega_{HPU} = (V_{PP} \times \%\ PS)\left(\frac{GR_{HPU}}{D_{HPU}/2}\right) \qquad \text{Eq. 8}$$

Addition of percent process speed % PS in Equation 8 is for the same purpose as previously described. Speed tracking may be performed continuously for the duration of the punching cycle between track position $P_{track}$ where the punch location $PL_1$ is upstream of punch point PP, and stage position $P_{stage}$ where a hole $H_1$ has been punched through punch location $PL_1$ and is downstream of punch point PP, thereby allowing the linear speed $V_{HPU}$ of punch head 220 to substantially match with the linear speed $V_{PP}$ of media sheet M as punch arm 214 approaches, reaches, and leaves punch point PP. Matching the linear speeds during such portion of the punching cycle advantageously prevents media sheets from being caught or jammed in the punch area, while still allowing precise punching of holes through desired punch locations $PL_n$ on each media sheet at the punch point PP.

Figure 9E:
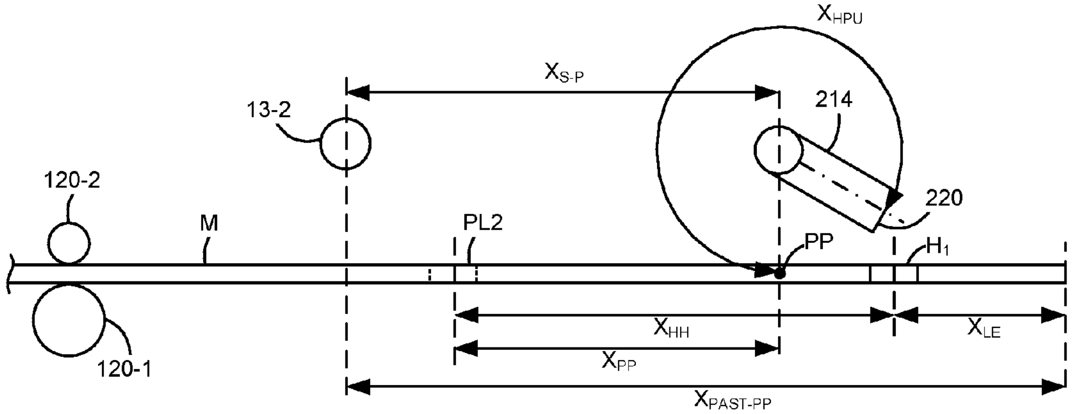

Once punch arm reaches stage position $P_{stage}$, speed tracking of advancing media sheet M is deactivated and position error correction with respect to the next punch location $PL_2$ is commenced, as shown for example in FIG. 9E. In particular, $X_{HPU}$ and $X_{PP}$ are calculated using the same equations described above with respect to first punch location $PL_1$ or more generally punch location $PL_n$, and a determined position error and proportional gain $K_P$ are multiplied together to yield a position error correction value. The position error correction value is then used to adjust the speed of punch motor 112 to correct travel distances between punch head 220 and punch location $PL_2$ or more generally, the next punch location $PL_{n+1}$. Position error correction is continuously performed for the portion of the hole punching cycle where punch arm 214 rotates from stage position $P_{stage}$ to track position $P_{track}$. Optionally, to account for any disturbances that may occur, hole sensor 13-3 may be positioned downstream of the punch point PP to detect the actual location of hole $H_n$ punched through punch location $PL_n$ on advancing media sheet M. Data obtained from hole sensor 13-3 may help provide additional information for more accurately determining travel distance of the subsequent punch location $PL_{n+1}$ to the punch point PP, and, thus, a more accurate position error and adjustment.

Thereafter, following position error correction, speed tracking is performed for the portion of the hole punching cycle where punch arm 214 rotates from the track position $P_{track}$ toward the stage position $P_{stage}$. The same equations and procedures for the speed tracking method described above with respect to the first punch location $PL_1$ can be applied. Accordingly, the linear speed $V_{HPU}$ of punch head 220 is adjusted to substantially match with the linear speed $V_{PP}$ of advancing media sheet M by varying the drive signal of punch motor 112 based at least upon the speed of media path motor 127 until punch arm 214 reaches the stage position $P_{stage}$.

The position error correction and speed tracking processes described above are repeated in a cyclic manner for each subsequent punch locations on media sheet M until all punch locations have been punched through. It is further noted that, for subsequent punch locations $PL_2$ to $PL_N$ after punch location $PL_1$, position error correction immediately follows after punch arm 214 reaches stage position $P_{stage}$. Once the last punch location $PL_N$ on a given media sheet M has been punched, punch motor 112 may be decelerated to stop punch arm 214 at or about park position $P_{park}$. In an example embodiment, $P_{park}$ may be selected depending on a location of a first punch location $PL_1$ on a subsequent media sheet to be punched. For example, if the first punch location $PL_1$ on the subsequent media sheet is relatively closer to its leading edge, punch arm 214 may be parked at a position relatively closer to $P_{track}$ so that an initial difference between travel distances of punch head 220 and the first punch location $PL_1$ on the subsequent media sheet to the punch point PP is substantially minimal.

As previously described, the angular positions $P_{track}$ and $P_{stage}$ may be selected to suitably accommodate the position error correction and speed tracking algorithms. For example, positions $P_{track}$ and $P_{stage}$ stage may be angularly displaced about punch position $P_{punch}$ a distance sufficient to allow for the performance of the position error correction and speed tracking just described. If positions $P_{track}$ and $P_{stage}$ stage are angularly positioned too close to punch position $P_{punch}$, velocity response of the system when the commanded speed is adjusted may not permit efficient speed tracking. On the other hand, if positions $P_{track}$ and/or $P_{stage}$ are angularly displaced too far away from punch position $P_{punch}$ (also resulting to park position $P_{park}$ being relatively closer to P 1 there may not be enough time to effectively perform position error correction as punch arm 214 rotates from stage position $P_{stage}$ (or park position $P_{park}$) toward the track position $P_{track}$. Accordingly, angular positions of $P_{track}$ and $P_{stage}$ about punch position $P_{punch}$ are empirically determined for HPU 12 to provide optimum results. In one example embodiment, $P_{stage}$ and $P_{track}$ track may correspond to angular positions where punch head 220 is clear of media sheet M passing through HPU 12. For example, referring back to FIG. 8, $P_{track}$ may be selected where a circumferential gap 270-1 exists between punch head 220 and media sheet M before punch head 220 engages media sheet M, which may be at least 5 mm. Similarly, $P_{stage}$ may be selected where a circumferential gap 270-2 exists between punch head 220 and media sheet M after punch 200 disengages media sheet M, which may be at least 5 mm. In another embodiment, for a given radius of punch arm 214 of about 16 mm, angular displacement of each of $P_{track}$ and $P_{stage}$ from $P_{punch}$ maybe substantially the same, such as about 45°. In still another example embodiment, $P_{track}$ and $P_{stage}$ may have different angular displacements from $P_{punch}$. For example, $P_{track}$ track may be angularly displaced at about 49° from $P_{punch}$ while $P_{stage}$ may be angularly displaced therefrom at about 35 degrees.

Figure 10:
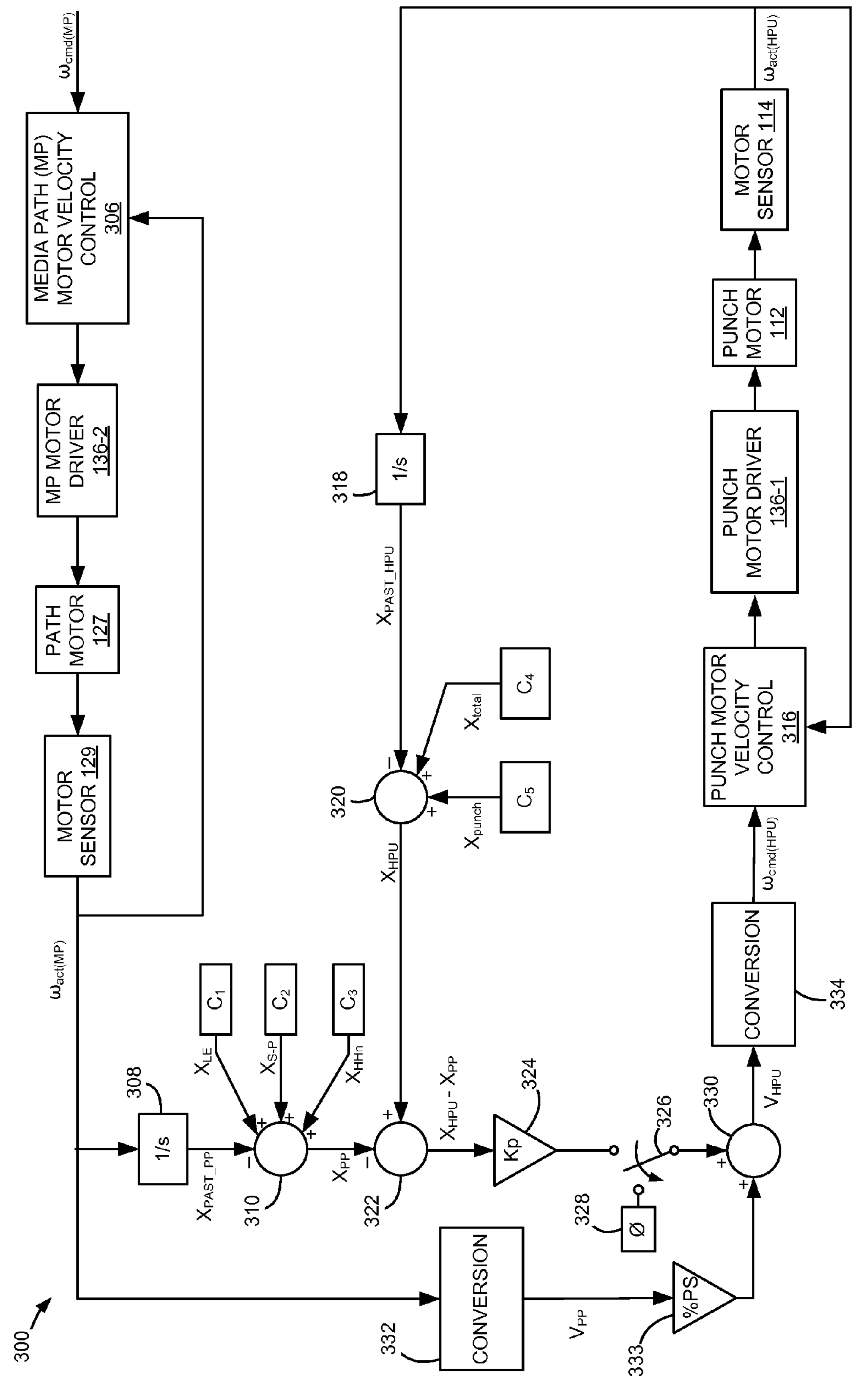
FIG. 10 is a block diagram of a closed loop control system for driving the punch motor according to an example embodiment.

With reference to FIG. 10, a block diagram of an example form of a closed loop control system 300 that may be used to control punch motor 112 is shown. During a punching operation, a media path (MP) motor commanded rotational speed $\omega_{cmd(MP)}$, which may be provided by controller 26 associated with finisher 8, is input to a media path MP motor velocity control block 306. MP motor velocity control block 306 may be implemented in controller 26 and employ one or more velocity control methods, such as PID control, state feedback control, etc., to control rotation of punch motor 127. Output of MP motor velocity control block 306 is provided to motor driver 136-2, which in turn controls media path motor 127 to rotate at the commanded rotational speed to advance a media sheet. The actual rotational speed $\omega_{act(MP)}$ measured from motor sensor 129 is fed back to MP motor velocity control block 306 to adjust velocity control of the media path motor 127. An integrator 308 receives the actual rotational speed $\omega_{act(MP)}$ as input and generates the linear distance $X_{PAST\_PP}$ traveled by the media sheet M which is fed to node 310. Node 310 also receives as input constants $C_1$, $C_2$, and $C_3$, corresponding to the known distance $X_{LE}$ between the leading edge and the first punch location $PL_1$, the predetermined distance $X_{S\text{-}P}$ between media sensor 13-2 and the punch point PP, and the distance $X_{HHn}$, where n=0 when no other punch locations are present and n=1, 2, . . . , N−1 between successive pairs of punch locations $PL_1$-$PL_2$, $PL_2$-$PL_3$, . . . $PL_{N-1}$-$PL_N$ when successive punch locations are present, respectively. The output of node 310 is the remaining travel distance $X_{PP}$ of the punch location $PL_n$ on the media sheet to the punch point PP.

A commanded linear speed $\omega_{cmd(HPU)}$ for punch motor 112 is input to a punch motor velocity control block 316. Punch motor velocity control block 316 may also be implemented in controller 26 and employ one or more velocity control methods, such as described above with respect to MP motor velocity control block 306, to control rotation of media path motor 116. Output of punch motor velocity control block 316 is provided as input to the punch motor driver 136-1 which in turn controls the punch motor 112 to rotate at the commanded rotational speed. The actual rotational speed $\omega_{act(HPU)}$ measured from motor sensor 114 is fed back to punch motor velocity control block 316 for adjusting velocity control of the punch motor 112. An integrator 318 receives the actual rotational speed $\omega_{act(HPU)}$ as input and generates the circumferential distance $X_{PAST\_HPU}$ traveled by the punch head 220 which is fed to node 320. Node 320 also receives constants $C_4$ and $C_5$ which correspond to the total circumferential travel distance $X_{total}$ of punch head 220 for one rotational cycle of punch arm 214, and the circumferential distance $X_{punch}$ traveled by punch head 220 from $P_{track}$ to $P_{punch}$, respectively. The output of node 320 is the remaining circumferential travel distance $X_{HPU}$ of punch head 220 to the punch point PP.

A node 322 receives as input both $X_{PP}$ and $X_{HPU}$ from nodes 310 and 320, respectively, and outputs the position error between the punch head 220 and the punch location $PL_n$, which in turn is received by gain block 324. Gain block 324 contains a proportional gain $K_P$ factor such that the position error between the punch head 220 and punch location $PL_n$ will approach zero or eventually zero out. A switch 326 selectively connects an input of a node 330 to one of the output of gain block 324, which corresponds to a position error correction value, and a null block 328. When performing position error correction, switch 326 connects the output of gain block 324 to input into node 330. Node 330 also receives as input the linear speed $V_{PP}$ of the advancing media sheet M which is the output of a conversion block 332 that converts the actual rotational speed $\omega_{act(MP)}$ of the media path motor 127 to linear speed. Additionally or in the alternative, a % PS block 333 may be provided to receive the output of conversion block 332 in order to control the radian speed of punch motor 112 to be slightly slower in relation to media path motor 127, as previously described. Thus, when the output of gain block 324 is fed to node 330, the output of node 330 is the commanded linear speed $V_{HPU}$ of punch motor 112 applied with the positional error correction value. The commanded linear speed $V_{HPU}$ is converted by conversion block 334 into the commanded rotational $\omega_{cmd(HPU)}$ for the punch motor 112. On the other hand, when performing speed tracking, switch 326 connects the output of gain block 324 to null block 328 such that output of node 330 corresponds to the linear speed $V_{PP}$ of the media sheet, thereby allowing the commanded linear speed $V_{HPU}$ of punch motor 112 to be substantially the same as (or slightly slower than) the linear speed $V_{PP}$ of the media sheet.

Figure 11A:
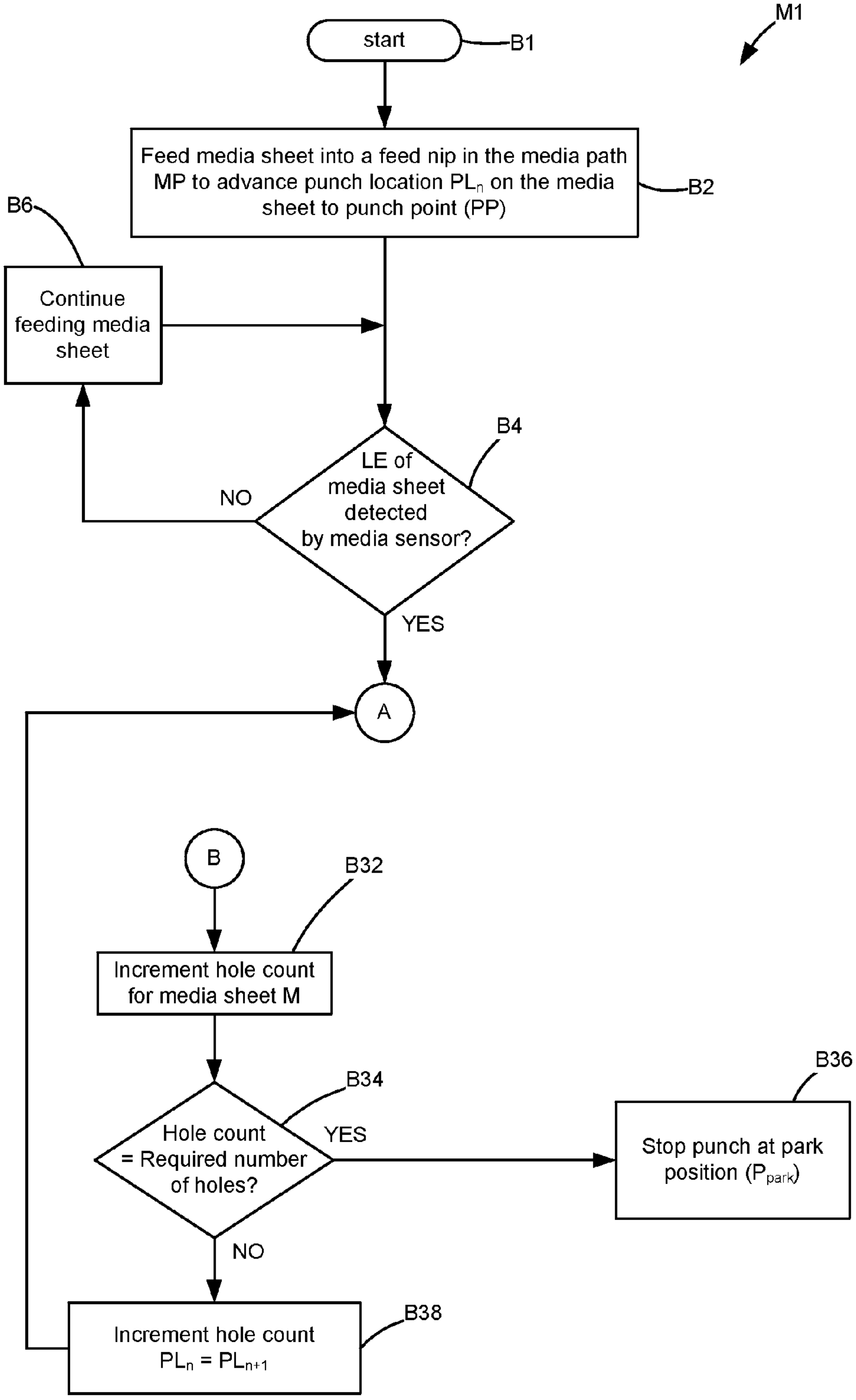
FIGS. 11A-11B illustrate a flowchart of a method for controlling the rotary hole punch assembly.
Figure 11B:
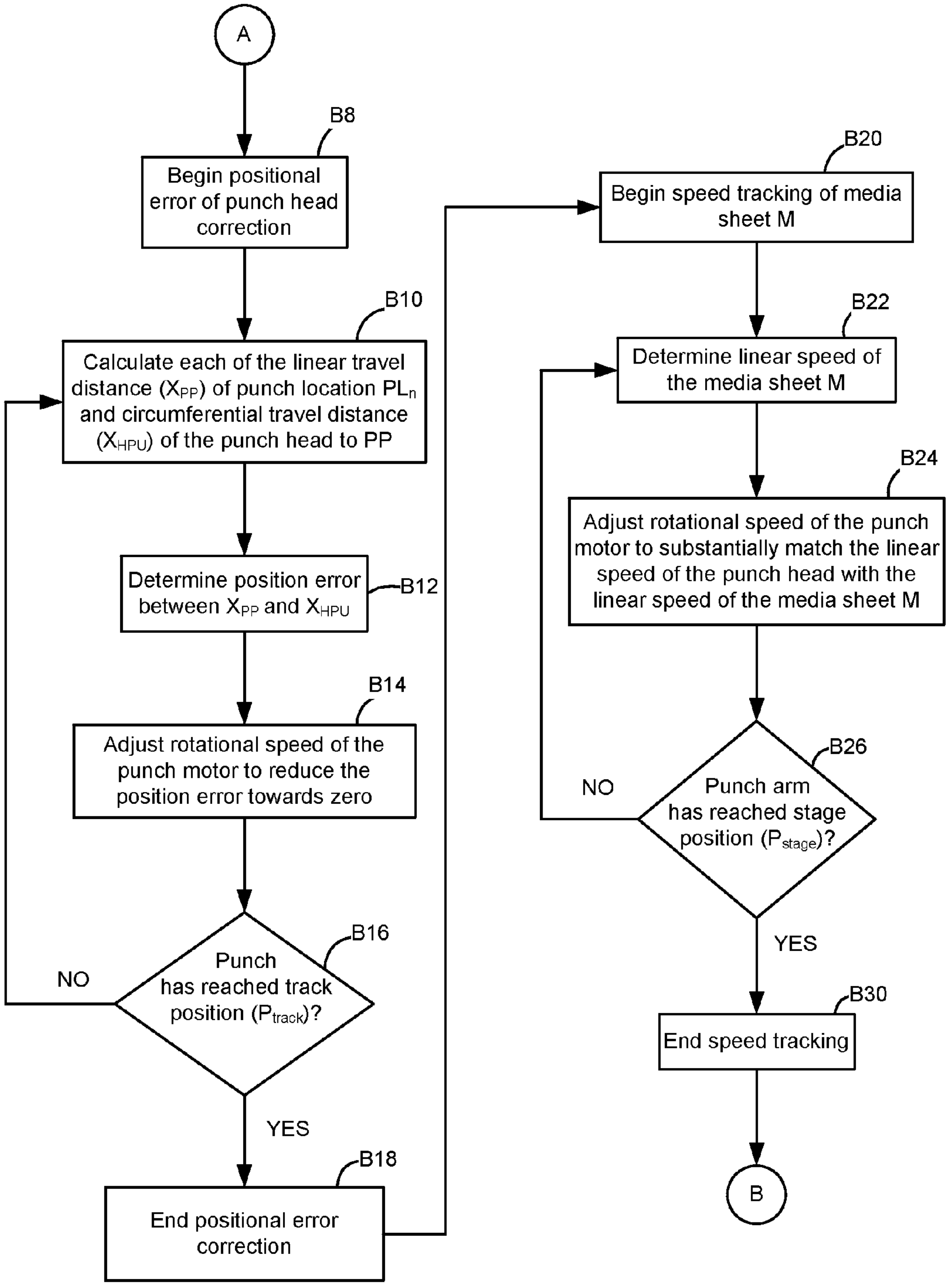

Referring now to FIGS. 11A-11B, a block diagram of a method M1 for controlling punch assembly 108 for punching one or more holes through a media sheet advanced along media path MP in imaging device 2, is illustrated.

Method M1 begins at start block B1. At block B2, a media sheet is fed in the media path MP and moved therealong to advance a first punch location $PL_n$ on the media sheet to the punch point PP. At block B4, a determination is made as to whether or not the leading edge LE of the media sheet has been detected by the media sensor 13-2. On determining that the leading edge LE has not been detected by the media sensor 13-2, method M1 proceeds to block B6 where the feeding of the media sheet by media path assembly 100 continues. Thereafter method M1 loops back to block B4. When it is determined, at block B4, that the leading edge of the media sheet has been detected by the media sensor 13-2, method M1 proceeds to block B8 (FIG. 11B) to begin positional error correction for the punch arm 214. At block B10, method M1 calculates each of the linear travel distance $X_{PP}$ of the punch location $PL_n$ and the circumferential travel distance $X_{HPU}$ of the punch head 220 to the punch point PP. At block B12, method M1 determines a position error between the travel distances of the punch location $PL_n$ and the punch head 220, and then at block B14 adjusts the rotational speed of the punch motor 112 to reduce the position error towards zero.

At block B16, a determination is made as to whether or not punch arm 214 has reached track position $P_{track}$. On determining that punch arm 214 has not reached the track position $P_{track}$, method M1 loops back to block B10 to continue with the positional error correction, taking into account the current positions of the punch location $PL_n$ and the punch head 220 relative to the punch point PP in recalculating the travel distances at block B10, redetermining position error at block B12, and readjusting the rotational speed of the punch motor at block B14. When it is determined, at block B16, that punch arm 214 has reached track position $P_{track}$, method M1 ends the positional error correction at block B18. Thus, positional error correction is continuously performed until punch arm 214 reaches the track position $P_{track}$.

Method M1 then proceeds to block B20. At block B20, method M1 begins speed tracking of the advancing media sheet M. At block B22, method M1 determines a linear speed of the media sheet M, and then adjusts the rotational speed of punch motor 112 to substantially match the linear speed of the punch head 220 with the linear speed of the media sheet M, at block B24. At block B26, a determination is made as to whether or not punch arm 214 has reached stage position $P_{stage}$. When it is determined that punch arm 214 has not reached the stage position $P_{stage}$, method M1 proceeds back to block B22 to continue with the speed tracking operation. When it is determined, at block B26, that the punch arm 214 has reached the stage position $P_{stage}$, method M1 ends the speed tracking operation at block B30. During speed tracking of media sheet M and between the time when the punch arm 214 arrives at track position $P_{track}$ and the time when the punch arm 214 reaches the stage position $P_{stage}$, a hole $H_n$ is punched by the punch head 220 through the punch location $PL_n$ on media sheet M.

Thereafter, at block B32 (FIG. 11A), a hole count for media sheet M is incremented and method M1 proceeds to block B34 to determine whether or not the hole count is equal to the required number of holes to be punched through the media sheet M. When it is determined that the hole count is not equal to the total number of holes, the punch location $PL_n$ is incremented by 1 to $PL_{n+1}$ at block B38 and then method M1 loops back to block B8 (FIG. 11B) to perform positional error correction relative to the next punch location $PL_{n+1}$ and speed tracking thereafter. When, at block B34, it is determined that the hole count is equal to the required number of holes for media sheet M, method M1 proceeds to block B36 where the rotation of punch motor 112 is decelerated to eventually stop punch arm 214 at park position $P_{park}$.

The foregoing described process M1 of punching holes through a media sheet is repeated for subsequent media sheets that need punching.

With the above example embodiments, a DC motor is used as a punch motor in lieu of a stepper motor in a hole punch system. To achieve accurate and reliable hole placement, a closed-loop system for controlling the hole punch system is used to allow positional error correction and speed tracking between the punch motor and the media path motor. Positional error correction ensures the position error between punch position PP and punch location PL on the media sheet is substantially zeroed out before the punch hits the media sheet at the punch location PL. On the other hand, speed tracking ensures that the linear speeds of both the media sheet and the punch are substantially the same. If any disturbance (e.g., jams or high load) is experienced by the media path motor, the punch motor can follow suit to avoid tearing up the media sheet. Thus, by using closed-loop punch motor control, more accurate and adaptive control can be achieved. Actual speed and position of the punch can be determined and the system can be controlled to compensate for disturbances or correct errors in the system.

Other relatively apparent advantages of the example embodiments of the present disclosure include, but are not limited to, reduced cost due to the relatively lower system cost of using DC motors compared to systems utilizing stepper motors, support for different media weights at higher throughput rates with improved robustness, improved flexibility of hole punching patterns without reducing process speed, reduced power consumption, reduced acoustic noise, and reduced overall weight and size of the hole punch system.

The description of the details of the example embodiments have been described in the context of using DC motors as punch motors for hole punch systems. However, it will be appreciated that the teachings and concepts provided herein can be applied for other hole punch systems employing closed-loop punch motor control using all other types of motors, including AC motors, DC motors, and stepper motors, provided that the feedback mechanism for the motor is used for position error correction and speed tracking as described herein.

The foregoing description of embodiments has been presented for purposes of illustration. It is not intended to be exhaustive or to limit the present disclosure to the precise steps and/or forms disclosed, and obviously many modifications and variations are possible in light of the above teaching. It is intended that the scope of the invention be defined by the claims appended hereto.

What is claimed is:

1. In a sheet processing apparatus having a media path therein and a punch assembly that defines a punch point along the media path at which a hole is punchable through a media sheet at a punch location thereon and is moveable along the media path by a plurality of rollers drivable by a media path motor, the punch assembly including a rotatable punch arm having a punch head at a free end thereof and drivable by a punch motor to rotate to the punch point at which the punch head engages the media sheet, a method of controlling the punch motor for punching a hole through the media sheet, the method comprising:

advancing the media sheet along the media path to punch a hole therethrough at the punch location;

applying a drive signal to the punch motor to initiate rotation of the punch arm toward the punch point;

during the advancing of the media sheet and the rotation of the punch arm, obtaining motion feedback signals associated with each of the media path motor and the punch motor;

simultaneously determining a travel distance of the punch location on the media sheet to the punch point and a circumferential travel distance of the punch head to the punch point;

calculating a position error between the punch head and the punch location based on a difference between the travel distance and the circumferential travel distance; and, based on the obtained motion feedback signals, varying the drive signal for the punch motor to drive the punch arm at a rotational speed to cause the punch head to arrive at the punch point at substantially the same time as the punch location on the media sheet arrives at the punch point, wherein the varying the drive signal includes adjusting the drive signal based on the position error to drive the punch arm at a rotational speed that substantially reduces the position error toward zero.

2. The method of claim 1, wherein the adjusting the drive signal based on the position error initiates when the punch arm arrives at a predetermined angular position after the punch point relative to a direction of rotation of the punch arm.

3. The method of claim 1, wherein the adjusting the drive signal based on the position error ends when the punch arm arrives at a predetermined angular position before the punch point, relative to a direction of rotation of the punch arm.

4. The method of claim 1, further comprising:

determining a linear speed of the media sheet along the media path based on the motion feedback signals associated with the media path motor, wherein the varying the drive signal includes adjusting the drive signal for the punch motor to drive the punch arm at a rotational speed that causes a linear speed of the punch head to substantially match the linear speed of the media sheet.

5. The method of claim 4, wherein the adjusting the drive signal initiates when the punch arm arrives at a predetermined angular position before the punch point, relative to a direction of rotation of the punch arm.

6. The method of claim 4, wherein the adjusting the drive signal ends when the punch arm arrives at a predetermined angular position after the punch point, relative to a direction of rotation of the punch arm.

7. In a sheet processing apparatus having a plurality of feed rolls disposed along a media path and drivable by a media path motor for advancing a media sheet along the media path, and a punch assembly having a rotatable punch arm drivable by a punch motor for punching a hole through the media sheet at a punch point defined along the media path, the punch arm including a punch head at a free end, a method of controlling the punch motor for punching a hole through the media sheet, the method comprising:

determining a punch location on the media sheet;

advancing the media sheet along the media path to advance the punch location toward the punch point;

initiating a rotational punching cycle of the punch arm;

during a first portion of the rotational punching cycle before the punch arm arrives at the punch point:

determining positions of each of the punch location and the punch head relative to the punch point;

calculating a position error based on a difference between the determined positions; and varying a speed of the punch motor to substantially reduce the position error toward zero; and during a second portion of the rotational punching cycle following the first portion thereof and within which the punch arm arrives at the punch point:

determining a linear speed of the media sheet; and adjusting the speed of the punch motor such that a linear speed of the punch head substantially matches the linear speed of the media sheet.

8. The method of claim 7, wherein the first portion of the rotational punching cycle begins when the punch arm is at a first angular position after the punch point and ends when the punch arm is at a second angular position before the punch point, relative to a direction of the rotational punching cycle, and the second portion of the rotational punching cycle begins when the punch arm is at the second angular position and ends when the punch arm is at the first angular position.

9. The method of claim 8, further comprising parking the punch arm at an angular position between the first and second angular positions within the first portion of the rotational punching cycle after punching a predetermined number of holes through the media sheet.

10. The method of claim 1, further comprising sensing motion of the media path motor and the punch motor using a sensing mechanism.

11. The method of claim 7, further comprising sensing motion of the media path motor and the punch motor using a sensing mechanism.

12. In a sheet processing apparatus having a media path therein and a punch assembly that defines a punch point along the media path at which a hole is punchable through a media sheet at a punch location thereon and is moveable along the media path by a plurality of rollers drivable by a media path motor, the punch assembly including a rotatable punch arm having a punch head at a free end thereof and drivable by a punch motor to rotate to the punch point at which the punch head engages the media sheet, a method of controlling the punch motor for punching a hole through the media sheet, the method comprising:

advancing the media sheet along the media path to punch a hole therethrough at the punch location;

applying a drive signal to the punch motor to initiate rotation of the punch arm toward the punch point;

during the advancing of the media sheet and the rotation of the punch arm, obtaining motion feedback signals associated with each of the media path motor and the punch motor;

determining a linear speed of the media sheet along the media path based on the motion feedback signals associated with the media path motor; and, based on the obtained motion feedback signals, varying the drive signal for the punch motor to drive the punch arm at a rotational speed to cause the punch head to arrive at the punch point at substantially the same time as the punch location on the media sheet arrives at the punch point, wherein the varying the drive signal includes adjusting the drive signal for the punch motor to drive the punch arm at a rotational speed that causes a linear speed of the punch head to substantially match the linear speed of the media sheet.

13. The method of claim 12, further comprising:

simultaneously determining a travel distance of the punch location on the media sheet to the punch point and a circumferential travel distance of the punch head to the punch point; and calculating a position error between the punch head and the punch location based on a difference between the travel distance and the circumferential travel distance, wherein the varying the drive signal includes adjusting the drive signal based on the position error to drive the punch arm at a rotational speed that substantially reduces the position error toward zero.

14. The method of claim 13, wherein the adjusting the drive signal based on the position error initiates when the punch arm arrives at a predetermined angular position after the punch point relative to a direction of rotation of the punch arm.

15. The method of claim 13, wherein the adjusting the drive signal based on the position error ends when the punch arm arrives at a predetermined angular position before the punch point, relative to a direction of rotation of the punch arm.

16. The method of claim 12, wherein the adjusting the drive signal initiates when the punch arm arrives at a predetermined angular position before the punch point, relative to a direction of rotation of the punch arm.

17. The method of claim 12, wherein the adjusting the drive signal ends when the punch arm arrives at a predetermined angular position after the punch point, relative to a direction of rotation of the punch arm.

18. The method of claim 12, further comprising sensing motion of the media path motor and the punch motor using a sensing mechanism.

19. The method of claim 7, wherein the determining the positions of each of the punch location and the punch head includes determining a travel distance of the punch location on the media sheet to the punch point and a circumferential travel distance of the punch head to the punch point.

20. The method of claim 19, wherein the calculating the position error includes calculating the position error based on a difference between the travel distance and the circumferential travel distance.

21. The method of claim 7, wherein the second portion of the rotational punching cycle begins when a circumferential clearance gap of at least 5 mm is defined between the punch head and the advancing media sheet before the punch head engages the advancing media sheet.

22. The method of claim 7, wherein the second portion of the rotational punching cycle ends when a circumferential clearance gap of at least 5 mm is defined between the punch head and the advancing media sheet after the punch head engages the advancing media sheet.

* * * * *